US009597640B2

(12) United States Patent
Koiwa et al.

(10) Patent No.: US 9,597,640 B2
(45) Date of Patent: Mar. 21, 2017

(54) SEPARATION MEMBRANE ELEMENT AND PRODUCTION METHOD FOR SAME

(75) Inventors: Masakazu Koiwa, Otsu (JP); Kentaro Takagi, Otsu (JP); Hiroho Hirozawa, Otsu (JP); Yoshiki Okamoto, Otsu (JP); Masahiro Kimura, Otsu (JP)

(73) Assignee: Toray Industries, Inc. (JP)

(*) Notice: Subject to any disclaimer, the term of this patent is extended or adjusted under 35 U.S.C. 154(b) by 278 days.

(21) Appl. No.: 14/361,776

(22) PCT Filed: Dec. 27, 2011

(86) PCT No.: PCT/JP2011/080245
§ 371 (c)(1),
(2), (4) Date: May 30, 2014

(87) PCT Pub. No.: WO2013/080391
PCT Pub. Date: Jun. 6, 2013

(65) Prior Publication Data
US 2015/0068971 A1    Mar. 12, 2015

(30) Foreign Application Priority Data

Dec. 2, 2011  (JP) .................................. 2011-264501
Dec. 22, 2011 (JP) .................................. 2011-280897

(51) Int. Cl.
*B01D 63/10* (2006.01)
*B01D 69/12* (2006.01)
(Continued)

(52) U.S. Cl.
CPC ......... *B01D 63/103* (2013.01); *B01D 65/003* (2013.01); *B01D 67/0088* (2013.01);
(Continued)

(58) Field of Classification Search
CPC ............ B01D 2313/04; B01D 2323/46; B01D 2313/143; B01D 63/103; B01D 65/003; B01D 69/12; B01D 67/0088
See application file for complete search history.

(56) References Cited

U.S. PATENT DOCUMENTS 3,367,504 A    2/1968  Westmoreland
3,813,334 A *  5/1974  Bray .................... B01D 63/10
                                                    210/321.83

(Continued)

FOREIGN PATENT DOCUMENTS

JP    44-014216 B    6/1969
JP    59-44506       3/1984
(Continued)

OTHER PUBLICATIONS

English translation Japanese Patent Application No. 2004-050081 A (2004).*

(Continued)

*Primary Examiner* — John Kim
(74) *Attorney, Agent, or Firm* — DLA Piper LLP (US)

(57) ABSTRACT

A spiral separation membrane element includes a water collection tube; a separation membrane wound around the water collection tube, having a feed-side surface and a permeate-side surface, and including a band-shaped region on at least one end of the feed-side surface in an axial direction of the water collection tube; and a channel material fused to the band-shaped region.

11 Claims, 7 Drawing Sheets

(51) Int. Cl.
    *B01D 65/00* (2006.01)
    *B01D 67/00* (2006.01)
(52) U.S. Cl.
    CPC .......... *B01D 69/12* (2013.01); *B01D 2313/04* (2013.01); *B01D 2313/143* (2013.01); *B01D 2323/46* (2013.01)

(56) References Cited

U.S. PATENT DOCUMENTS

| | | |
|---|---|---|
| 4,944,877 A | 7/1990 | Maples |
| 6,277,282 B1 | 8/2001 | Kihara et al. |
| 2004/0124133 A1 | 7/2004 | Irie et al. |
| 2005/0006301 A1 | 1/2005 | Angelini et al. |
| 2007/0023290 A1 | 2/2007 | Hawkins et al. |
| 2010/0193428 A1* | 8/2010 | Hane ............ B01D 69/10 210/489 |
| 2012/0018366 A1* | 1/2012 | Buser ............ B01D 63/10 210/321.64 |

FOREIGN PATENT DOCUMENTS

| | | |
|---|---|---|
| JP | 59-044506 A | 3/1984 |
| JP | 4-11928 | 1/1992 |
| JP | 04-011928 B2 | 3/1992 |
| JP | 11-226366 A | 8/1999 |
| JP | 2000-000437 A | 1/2000 |
| JP | 2000-042378 A | 2/2000 |
| JP | 2004-050081 A | 2/2004 |
| JP | 2004-508170 A | 3/2004 |
| JP | 2005-305422 A | 11/2005 |
| JP | 2011-92905 | 5/2011 |
| WO | 00/44481 | 8/2000 |
| WO | 2010/098803 | 9/2010 |

OTHER PUBLICATIONS

First Office Action dated Jun. 19, 2015 from corresponding Chinese Patent Application No. 201180075067.6.
Extended European Search Report dated Jul. 21, 2015 from corresponding European Patent Application No. 11 87 6445.5.

* cited by examiner

SEPARATION MEMBRANE ELEMENT AND PRODUCTION METHOD FOR SAME

TECHNICAL FIELD

This disclosure relates to a spiral separation membrane element adapted to separate components in a fluid by a reverse osmosis technique or a filtration technique using a separation membrane.

BACKGROUND

Separation membranes that separate a fluid or the like are classified into various types according to the differences in the pore size and separation function thereof. However, even in separation membranes different in type, they have a commonality in that when a raw fluid is supplied to one surface of the separation membrane, a permeate fluid separated from the raw fluid by permeating the separation membrane is obtained from the other surface. The separation membrane can be applied to a separation membrane element used for reverse osmosis-filtration. For example, the spiral separation membrane element includes a water collection tube with holes, and includes a channel material on the feed side wound around the water collection tube, a separation membrane and a channel material on the permeate side. The channel material on the feed side supplies the raw fluid to a feed fluid side of the separation membrane. The separation membrane separates components contained in the raw fluid. The channel material on the permeate side guides a permeate fluid which has permeated the separation membrane and separated from the raw fluid to a holed water collection tube. The spiral separation membrane element can take out a large amount of a permeate fluid by applying pressure to the raw fluid.

The resistance (i.e., pressure loss) generated when the raw fluid flows through a flow path on the feed side of the spiral separation membrane element is greatly dominated by a channel material on the feed side. Therefore, nets having various structures are reported for the purpose of reducing the pressure loss (for example, refer to Japanese Patent Laid-open Publication Nos. 2000-000437, 2000-042378 and 2005-305422).

On the other hand, in a spiral membrane separation apparatus described in Japanese Utility Model Laid-open Publication No. 59-44506, mesh-like members for a raw solution flow path corresponding to a channel material on the feed side are arranged at both ends of the membrane separation apparatus.

Japanese Patent Laid-open Publication No. 2004-50081 points out a problem that the member for a raw solution flow path described in JP '506 is not fixed to a separation membrane, and proposes the following spiral membrane element to solve this problem. That is, in the spiral membrane element described in JP '081, raw water spacers and are fixed to an end on a flow-in side of raw water of the separation membrane, or fixed to the end on the flow-in side of raw water and an end on a flow-out side of concentrate water. The raw water spacers are fixed to the ends of the separation membrane by being bonded with an adhesive or by being arranged such that a folded raw water spacer sandwiches the end of the separation membrane between the folded faces.

Conventional techniques are not sufficient in reducing the resistance of the raw fluid and the pressure loss, and there is room for improvement to increase the amount of water produced. Particularly, in the conventional techniques, the morphology of the channel material on the feed side is limited to a net, and the degree of freedom of change in the shape is low.

It could therefore be helpful to provide a technique which enables changing the shape of the channel material on the feed side according to the type of a raw fluid, or a permeate fluid or a concentrate fluid to be obtained by enhancing the degree of freedom of change in the shape of the channel material on the feed side.

SUMMARY

We provide a separation membrane element which is a separation membrane element which includes a water collection tube, a separation membrane having a feed-side surface and a permeate-side surface, and a channel material disposed on the feed-side surface, wherein the channel material comprises a plurality of resin bodies fused to the feed-side surface.

Our elements and methods enable changing the shape of the channel material on the feed side according to the type of a raw fluid, or a permeate fluid or a concentrate fluid to be obtained by enhancing the degree of freedom of change in the shape of the channel material on the feed side.

DESCRIPTION OF REFERENCE SIGNS

Figure 1:
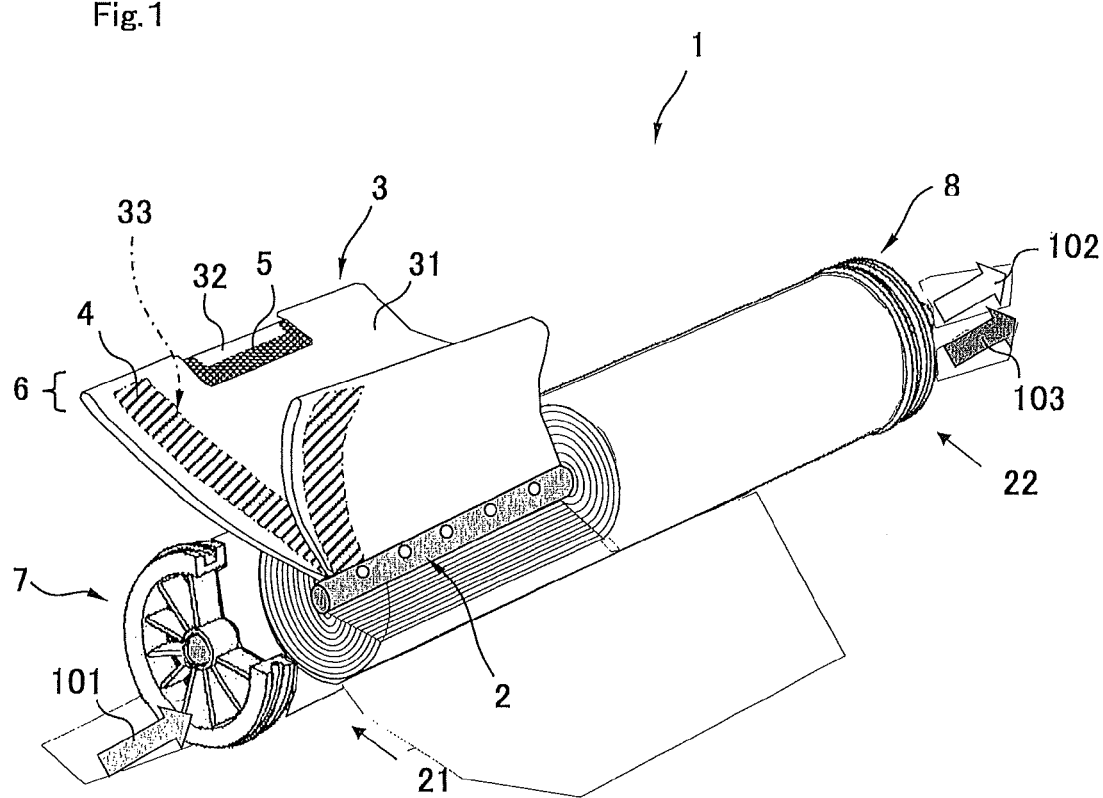
FIG. 1 is a perspective view in which a part of a spiral separation membrane element according to a first example.
Figure 1:
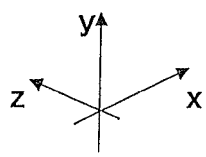

1: Spiral separation membrane element
2: Water collection tube
21: Upstream end of a separation membrane element
22: Downstream end of a separation membrane element
3: Separation membrane
31: Feed-side surface of a separation membrane
32: Permeate-side surface of a separation membrane
33, 34, 35: Band-shaped region (example of a first region)
37, 38, 39: Central region (example of a second region)
4, 41, 42: Channel material on the feed side
411, 421, 43 to 46: Resin body
5: channel material on the permeate side 6: Envelope-like membrane
7: Upstream end plate
8: Downstream end plate
101: Raw liquid fluid
102: Permeate fluid
103: Concentrate fluid
W0: Width of a separation membrane in an axial direction of a water collection tube
W1, W2, W4: Width of a first region in an axial direction of a water collection tube
W3: Distance between first regions disposed at an end of a separation membrane in an axial direction of a water collection tube
D: Distance between apexes of resin bodies

DETAILED DESCRIPTION

1. Overview of Separation Membrane Element

An example of the form of the spiral separation membrane element (hereinafter, simply referred to as a separation membrane element) will be described with reference to FIGS. 1 and 2.

Figure 2:
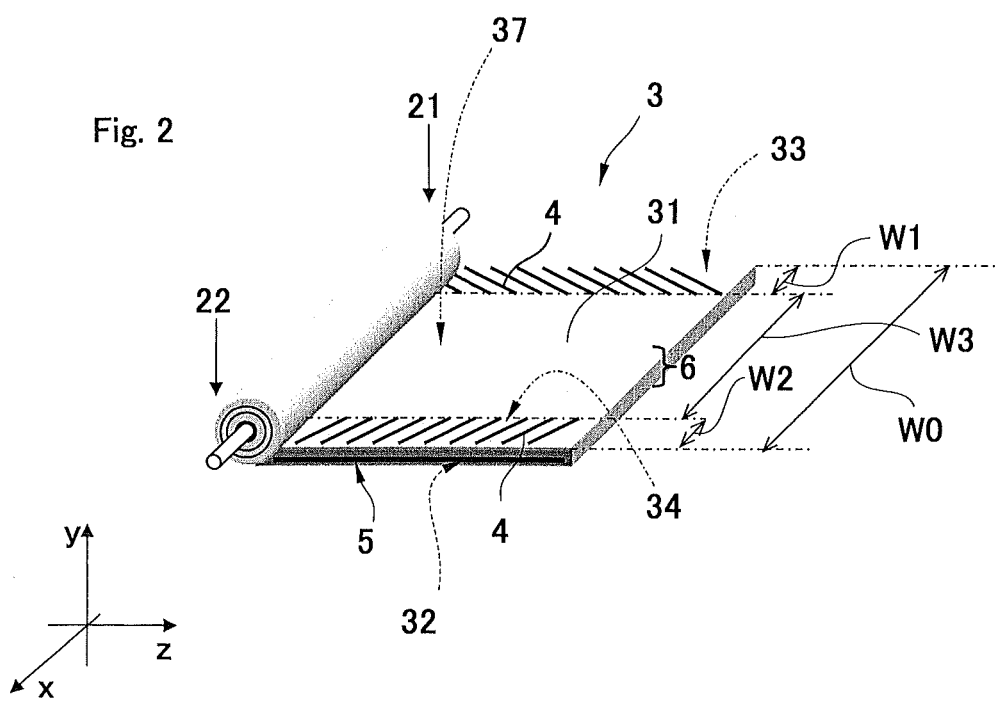
FIG. 2 is a developed perspective view of a spiral separation membrane element according to the first example.

As shown in FIGS. 1 and 2, a separation membrane element 1 includes a water collection tube 2, a separation membrane 3, a channel material 4 on the feed side, a channel material 5 on the permeate side, an end plate 7 on the feed side, and an end plate 8 on the permeate side. The separation membrane element 1 can separate a raw fluid 101 into a permeate fluid 102 and a concentrate fluid 103.

The water collection tube 2 is a cylindrical member which is long in one direction (the direction of x-axis in the drawings). A side surface of the water collection tube 2 is provided with a plurality of holes.

The separation membrane 3 may be a membrane having desired separation performance. Examples of a membrane applicable to the separation membrane 3 will be described later. The separation membrane 3 has a feed-side surface 31 in contact with the raw fluid 101 and a permeate-side surface 32 in contact with the permeate fluid 102.

The channel material 4 on the feed side is disposed on the feed-side surface 31 of the separation membrane 3. A region in which the density of the resin body is relatively high, and a region in which the density of the resin body is relatively low are disposed on the feed-side surface 31.

As the channel material 5 on the permeate side, conventional channel materials can be applied and, for example, fabrics such as tricot are used. The channel material 5 on the permeate side is arranged between two permeate-side surfaces 32 opposed to each other in an envelope-like membrane 6. However, the channel material 5 on the permeate side can be changed to another member which can form a channel material on the permeate side between the separation membranes 3. Further, when a separation membrane provided with projections and depressions is used as the separation membrane 3, the channel material 5 on the permeate side can be omitted. Details and other examples of the channel material on the permeate side will be described later.

The envelope-like membrane 6 is formed by using two separation membranes overlaid on each other so that the permeate-side surfaces 32 face inward, or one separation membrane 3 folded. The shape in a plan view of the envelope-like membrane 6 is rectangular, and the envelope-like membrane 3 is closed at three sides and opened at one side. The envelope-like membrane 6 is arranged such that an opening of the envelope-like membrane 6 faces the water collection tube 2, and wound around the water collection tube 2. In the separation membrane element 1, a plurality of envelope-like membranes 6 are wound overlapping one another. An outer surface of the envelope-like membrane 6 is the feed-side surface 31, and the envelope-like membranes 6 adjacent to each other are arranged so that the feed-side surfaces 31 are opposed to each other. That is, the flow path on the feed side is formed between the envelope-like membranes 6 adjacent to each other, and the flow path on the permeate side is formed on the inner side of the envelope-like membrane 6.

The end plate 7 on the feed side and the end plate 8 on the permeate side are respectively fitted on an upstream end 21 and a downstream end 22 of a wound body.

In addition, the separation membrane element may include a member other than the members described above. For example, the periphery of the wound body of the separation membrane may be covered with another member such as a film.

The raw fluid 101 is supplied to the feed-side surface 31 of the separation membrane 3 through the end plate 7 on the feed side. The permeate fluid 102 having permeated through the separation membrane 3 passes through a channel formed of the channel material 5 on the permeate side in the envelope-like membrane 6 and flows into the water collection tube 2. The permeate fluid having flowed through the water collection tube 2 passes through the end plate 8 and is discharged out of the separation membrane element 1. Further, the concentrate fluid 103 passes through a space between the feed-side surfaces 31 and is discharged out of the element from the end plate 8. Thus, the raw fluid 101 is separated into the permeate fluid 102 and the concentrate fluid 103.

2. Feed-Side Channel Material

A region (first region) in which the density of the channel material 4 is relatively high, and a region (second region) in which the density of the channel material 4 is relatively low are disposed on the feed-side surface 31. The first region may be referred to as a resin body region.

The channel material 4 on the feed side (the resin body constituting the channel material 4) is arranged at intervals of a predetermined value or less in the first region. The second region is a region not corresponding to the first region, and specifically the second region is a region where the resin body is not arranged or the interval of the resin body is larger than the predetermined value. Herein, the predetermined value is set according to operation conditions of the element or a material of the channel material, and is not limited to a specific value. For example, the predetermined value is preferably 50 mm, and more preferably 30 mm, 20 mm or 10 mm.

An area ratio of the first region to the second region, that is, (the area of the first region/the area of the second region), is preferably 1/99 or more, more preferably 10/90 or more, and further preferably 15/85 or more. The area ratio is preferably 80/20 or less, more preferably 60/40 or less, and further preferably 40/60 or less. When the area ratio is 1/99 or more, the occurrence of concentration polarization is suppressed, and when the area ratio is 80/20 or less, an increase in flow resistance is suppressed.

A boundary between the first region and the second region can be identified as an outer edge of an aggregate of resin bodies provided at intervals of 50 mm or less. The first region and the second region do not have to be distinguished from each other in the point other than the density of the channel material on the feed side. That is, the separation membrane included in the band-shaped region may have a composition and a structure that are the same as or different from those of the separation membrane out of the band-shaped region.

Such a separation membrane and channel material will be specifically described below. A constitution within a value range previously described herein can be applied to the examples described below.

First Example

Band-Shaped Region

In the form shown in FIGS. 1 and 2, as an example of the first region, band-shaped regions 33 and 34 are disposed at ends of the separation membrane 3 in an axial direction (that is, x-axis direction) of the water collection tube 2. A central region 37 is disposed as an example of the second region between the upstream channel material 4 on the feed side and the downstream channel material 4 on the feed side.

Edges of the band-shaped regions 33 and 34 do not have to be aligned with an edge of the separation membrane 3, and the band-shaped region may be apart from the edge of the separation membrane. However, the distance between the band-shaped region 33 and the upstream edge of the separation membrane, and the distance between the band-shaped region 34 and the downstream edge of the separation membrane are, for example, 5% or less, or 1% or less of a width W0 of the separation membrane 3 in the direction of x-axis. As described above, since the channel material 4 on the feed side is disposed in the vicinity of the edge of the separation membrane in the direction of x-axis, particularly, in the vicinity of the upstream edge, the raw fluid 101 is efficiently supplied to the feed-side surface 31.

Further, the "end" provided with the band-shaped region specifically refers to a region within 20% of the width W0 of the separation membrane 3 in a direction of x-axis from an edge of the separation membrane 3 in a direction of x-axis. That is, the channel material 4 on the feed side is arranged in an area within 20% of the width W0 of the separation membrane 3 in a direction of x-axis from an edge of the separation membrane 3 in a direction of x-axis. Therefore, a width W3 of the central region 37, that is, the width of the second region, is 80% or more of the width W0.

Further, since each of a width W1 of the band-shaped region 33 and a width W2 of the band-shaped region 34 is 1% or more of the width W0, the raw fluid is stably supplied to the feed-side surface 31.

Moreover, the total of the widths W1 and W2 of the band-shaped region may be set to about 10% to 60% of the width W0. When the ratio of the widths W1 and W2 to the width W0 is 60% or less, the flow resistance and pressure loss are reduced. Also, when the ratio is 10% or more, the occurrence of concentration polarization can be suppressed by a turbulence effect. Moreover, each of the widths W1 and W2 may be 10% or more of the width W0.

An example of such a morphology is this example in which shapes and sizes of the band-shaped regions 33 and 34 are the same. That is, the widths W1 and W2 in FIG. 2 are the same. Further, the widths W1 and W2 are respectively constant.

As described above, since the channel material 4 on the feed side is disposed at an end of the feed-side surface 31, a flow path of the raw fluid 101 is secured between the two feed-side surfaces 31 opposed to each other. In addition, in this example, the two band-shaped regions 33 and 34 are disposed in one feed-side surface 31, but this disclosure is not limited to this form, and the band-shaped region may be disposed only at one end in the direction of x-axis, that is, one of the upstream end and the downstream end.

When the separation membrane 3 is folded, it is preferred that the channel material 4 on the feed side is not arranged at a crease and the vicinity thereof to improve a folding property of the separation membrane 3, although it depends on the rigidity of a resin constituting the channel material 4 on the feed side.

In this example, a channel material is not disposed on the feed-side surface 31 other than the channel material 4 on the feed side provided by thermal fusion. Thereby, the flow resistance and pressure loss are reduced, and the amount of water produced is increased. Particularly, since a member having a continuous morphology such as a net or tricot is not disposed in the central region 37, an effect of significantly reducing the flow resistance and pressure loss is obtained. Moreover, since the central region 37 is continuous from the outer end to the inner end of the separation membrane 3 in the winding direction, this effect is more improved. However, in the feed-side surface 31, a member may be disposed in a region other than the band-shaped regions 33 and 34 by thermal fusion or another method to the extent acceptable from the viewpoint of flow resistance and pressure loss to enhance the rigidity of the spiral separation membrane element.

It is preferred that spaces are not generated in a bonded portion of the envelope-like membrane. When spaces are generated, since leakage occurs between the flow path on the permeate side and the flow path on the feed side in operating the element under a pressure, the raw fluid or the concentrate fluid is immixed into the permeate fluid. A high probability of causing such leakage means that the production yield of the separation membrane element is low. The production yield of the element is the ratio ((number of separation membrane elements with air leakage)/(number of separation membrane elements subjected to evaluation)) determined by conducting an air leakage test of produced separation membrane elements in water and counting the number of the separation membrane elements causing the leakage.

In contrast, when the channel material is disposed by fusion, since rigidity of the separation membrane is increased, distortion or a wrinkle of the separation membrane is hardly generated at the time of winding the separation membrane. Therefore, spaces are hardly generated between permeate-side surfaces opposed to each other. Consequently, a reduction of salt rejection or a reduction of production yield of the separation membrane element can be suppressed.

The first and second regions are preferably regularly arranged. In an example of such a constitution, the widths of the band-shaped regions 33 and 34 are respectively constant, and the band-shaped regions 33 and 34 are in parallel with each other. Moreover, the band-shaped regions 33 and 34 are disposed to be continuous from the outer end to the inner end of the separation membrane 3 in the winding direction (in the direction of z-axis in FIG. 2). That is, the band-shaped region 33 and the band-shaped region 34 have the same area. In addition, the width of the central region 37 is also uniform. By regular arrangement of the channel materials like this, stable rigidity and strength are achieved. Particularly, since the channel materials are continuously disposed in the winding direction, rigidity and strength are enhanced over the whole separation membrane in the winding direction.

In this example, while all of the first regions have the same area, in the case where three or more of the first regions are disposed in one separation membrane, at least two first regions preferably have the same area.

In addition, "the same" preferably means that, for example, the difference between two values to be compared with each other is 15% or less, more preferably that the difference is 10% or less, and further preferably that the difference is 5% or less. Further, "constant" preferably means that the difference between the maximum value and the minimum value is 15% or less, and preferably means that the difference is 10% or less, or that the difference is 5% or less.

In this example, the channel material 4 on the permeate side is a resin body or an aggregate of a plurality of resin bodies which are provided by fusion. Since the channel material is disposed by fusion, the degree of freedom of change in the shape of the channel material on the feed side is very high. Therefore, the shape of the channel material can be modified according to various conditions.

For example, the channel material 4 may have a continuous morphology, or may have a discontinuous morphology. However, to reduce the flow resistance of the raw fluid, the channel material 4 preferably has a discontinuous morphology.

A "continuous morphology" refers to a morphology of which a projected image of the channel material to the surface of the separation membrane is continuous. Examples of a member having such a morphology include woven cloths (e.g., tricot), fabrics (e.g., net), nonwoven fabrics, and porous materials (porous film and the like).

A "discontinuous morphology" refers to a morphology of which a projected image to the surface of the separation membrane is discontinuous in the band-shaped region. As the discontinuous morphology, a morphology in which a plurality of resin bodies are disposed at intervals on the separation membrane is exemplified. Further, the term "discontinuous" is also referred to as a state in which the distance between resin bodies adjacent to each other on one separation membrane is apart so that the permeate fluid can flow between the resin bodies.

As described above, the band-shaped regions 33 and 34 correspond to the first region. In this example, in these regions, resin bodies are arranged such that a distance D between apexes of the resin bodies is 50 mm. In addition, the apex refers to the highest portion of the resin body, in other words, the portion most distant from the feed-side surface 31. Examples of the distant D are as shown in FIG. 3, FIG. 4, and FIGS. 7A to 7D.

Further, the shape of each resin body is selected to reduce the flow resistance in the flow path on the feed side and to stabilize the flow path on the feed side.

As the shape of each resin body, a particle, a line, a hemisphere, a column (including a circular column, a prism and the like), or a wall-like body is applied. A plurality of linear or wall-like channel materials disposed on one separation membrane are only required to be arranged not to cross one another, and may be arranged in parallel with one another.

Further, in a plane direction, each resin body may have a form such as a line (e.g., FIG. 3), a curve, an ellipsoid (including a true circle and an oval), or a polygon (triangle, rectangle, square, parallelogram, rhombus, or trapezoid) and an indeterminate shape.

In a cross-section perpendicular to a face direction of the separation membrane, the channel material 4 (and a resin body contained therein) may have, for example, an ellipsoidal shape, a polygonal shape or an indeterminate shape. The ellipsoidal shape includes a true circle and an oval, and includes shapes in which a part of the above shapes is missing (e.g., FIG. 7B). The polygonal shape may be a trapezoid, (e.g., FIG. 7A, FIG. 7C), a triangle, a rectangle (e.g., FIG. 7D), a square, a parallelogram, a rhombus, or an indeterminate shape. In a cross-section perpendicular to a face direction of the separation membrane, the channel material on the feed side may have any of the forms in which the width of the channel material broadens (e.g., FIG. 7A, FIG. 7B), narrows (e.g., FIG. 7C), and is constant (e.g., FIG. 7D) from an upper part toward a lower part (that is, from an apex of the channel material on the feed side in the thickness direction toward the feed-side surface of the separation membrane).

The height of the channel material 4 (height difference between the channel material 4 and the feed-side surface 31) is preferably 80 µm or more, or 100 µm or more. Further, the height of the channel material 4 is preferably 2000 µm or less, 1500 µm or less, or 1000 µm or less. When the height difference is 2000 µm or less, the membrane area per element can be increased, and when the height difference is 80 µm or more, the flow resistance can be decreased. In addition, the height of the channel material 4 is also referred to as the thickness of the channel material 4 and agrees with the height of each resin body.

When the shape of each resin body is linear, an arrangement pattern of the resin body is preferably a stripe shape for convenience of production and for stable formation of the flow path on the feed side. In the stripe-shaped pattern, linear resin bodies are arranged not to cross one another. A linear shape may be a straight line or a curved line. The width of the linear resin body is preferably 0.2 mm or more, and more preferably 0.5 mm or more. The width of the linear resin body is preferably 10 mm or less, and more preferably 3 mm or less. The interval between resin bodies adjacent to each other can be selected from among one-tenth of the width of the resin body to 50 times the width of the resin body.

When the shape of each resin body is dot-shaped, the diameter of the dot-shaped resin body is preferably 0.1 mm or more, and more preferably 0.5 mm or more. Further, the diameter of the resin body is preferably 5.0 mm or less, and more specifically may be 1.0 mm or less. Examples of an arrangement pattern of the dot-shaped resin body include a staggered arrangement and a grid pattern. The interval between the resin bodies is preferably 0.2 mm or more, and more preferably 1.0 mm or more. Further, the interval between the resin bodies is preferably 20.0 mm or less, and more preferably 15.0 mm or less.

Further, in each first region, the projected area ratio of the channel material 4 on the feed side to the feed-side surface 31 is preferably 0.05 or more. Thereby, the flow path can be formed with more reliably. The projected area ratio is preferably less than 0.2. Thereby, the resistance of the raw fluid is reduced, the pressure loss is kept low, and an effective membrane area can be secured.

The width, diameter, interval, height and the like of the channel material 4 on the feed side and a resin material contained in the channel material 4 can be measured by using a commercially available shape measurement system. For example, the width and the interval can be determined by photographing any thirty cross-sections at a magnification of 500 times by using a scanning electron microscope (Model S-800) (manufactured by Hitachi, Ltd.), and calculating an arithmetic mean thereof from the results of measurement. The height (thickness) of the resin body can be determined by measuring any thirty points where the channel material is present by surface measurement or cross-section measurement using a laser microscope (high precision shape measurement system KS-1100 manufactured by KEYENCE CORPORATION and the like), and calculating an arithmetic mean thereof from the results of measurement.

In addition, the cross-section shape and a surface shape that is observed from above the membrane of the channel material on the feed side are not particularly limited as long as a desired effect as a spiral separation membrane element is not impaired.

A constituent resin of the channel material 4 is preferably a thermoplastic resin such as a polyolefin resin, a modified polyolefin resin, a polyester resin, a polyamide resin, a urethane resin, or an epoxy resin. Specifically, in view of processability and cost, polyolefin resins such as an ethylene-vinyl acetate copolymer resin, and polyester resins are more preferable as the resin, and polyolefin resins such as an ethylene-vinyl acetate copolymer resin and polyester resins, which can be processed at a temperature of 100° C. or lower, are particularly preferable.

The cross-section shape and the thickness (height difference) of the channel material 4 can be adjusted by changing the type of the resin and the temperature in the heat treatment such as thermal fusion.

Figure 3:
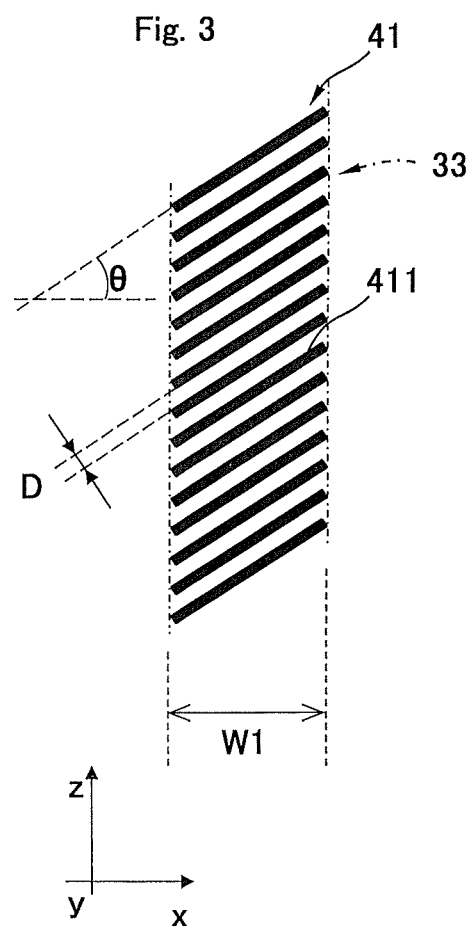
FIG. 3 is a plan view showing a stripe-shaped channel material that is an example of the channel material on the feed side.
Figure 4:
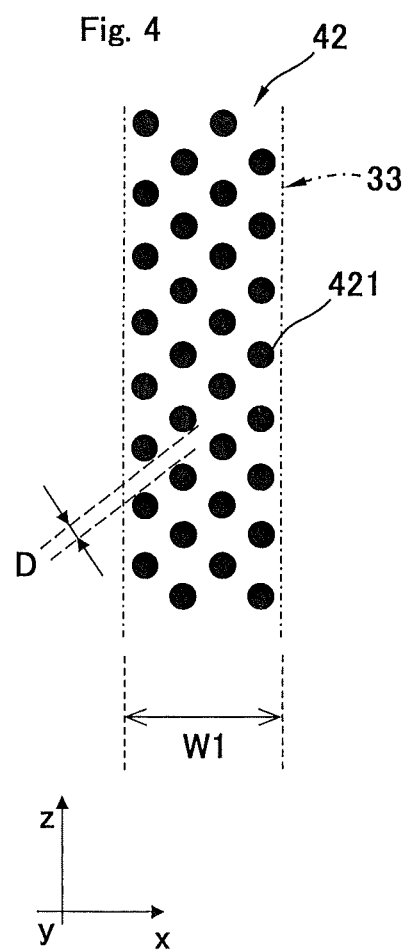
FIG. 4 is a plan view showing a dot-shaped channel material that is another example of the channel material on the feed side.

As examples of the arrangement pattern of the channel material described above, a stripe-shaped channel material 41 and a dot-shaped channel material 42 are shown in FIGS. 3 and 4. In addition, an upstream band-shaped region 33 is shown in FIGS. 3 and 4, and in this example, a channel material having the same shape and the same arrangement pattern as in the upstream band-shaped region 33 is arranged also in a downstream band-shaped region 34. However, the shape and the arrangement pattern of the channel material arranged in the downstream band-shaped region 34 may be the same as or different from those of the channel material arranged in the band-shaped region 33.

In the example shown in FIG. 3, the channel material 41 includes a plurality of resin bodies 411, and the resin body 411 is linear and has a shape which is long in an oblique direction relative to an axial direction (x-axis direction) of the water collection tube 2. Particularly, in FIG. 3, the resin bodies 411 are arranged in parallel with one another. An oblique arrangement means to exclude a parallel arrangement and an orthogonal arrangement. That is, an angle θ between the longitudinal direction of the resin body 411 and the x-axis direction is 0° or more and less than 90°. In addition, the angle θ is expressed by an absolute value. That is, two resin bodies which are axisymmetric with respect to the x-axis exhibit the same angle θ.

When the angle θ is smaller than 90°, since the flow of the raw fluid 101 is disturbed, concentration polarization hardly occurs and good separation performance is realized. When the angle θ is larger than 0°, an effect of suppressing concentration polarization is more enhanced. Further, when the angle θ is 60° or less, flow resistance of the raw fluid is relatively low and a good effect of suppressing concentration polarization can be achieved. Moreover, the angle θ is more preferably 15° or more and 45° or less to create a turbulence effect while reducing flow resistance.

In addition, in an arrangement in the form of stripes, an upstream channel material and a downstream channel material may be parallel with each other or may be non-parallel. For example, in an arrangement in the form of stripes, the upstream channel material and the down-stream channel material may be axisymmetric with respect to the z-axis, or may be asymmetric.

The channel material 42 shown in FIG. 4 includes a plurality of dot-shaped resin bodies 421. The shape in a plan view of each resin body 421 is circular, and the resin bodies 421 are arranged in the staggered form.

As described above, the separation membranes 3 are overlaid on each other such that the feed-side surfaces 31 are opposed to each other. The channel material 4 may be arranged such that the resin bodies provided on the feed-side surfaces 31 opposed to each other are overlaid on each other by thus overlaying the separation membranes 3.

Figure 5:
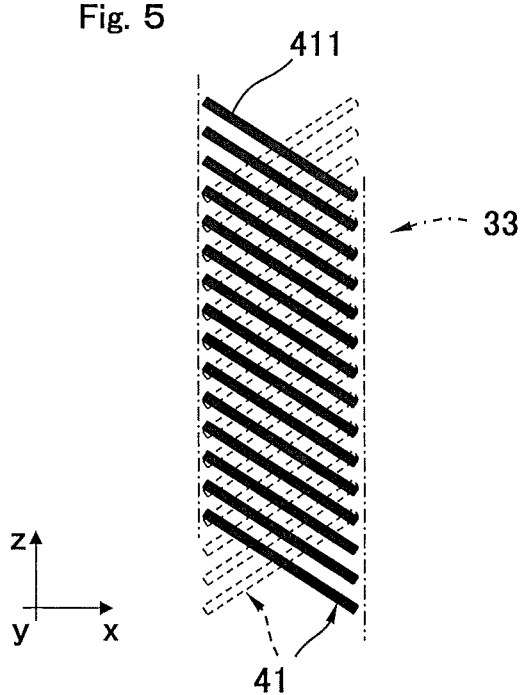
FIG. 5 is a plan view showing a state in which channel materials on the feed side overlap one another in two separation membranes opposed to each other.

As an example of such a constitution, FIG. 5 shows a state in which the channel materials 41 of FIG. 3 overlap one another. When the separation membrane 3 falls between the resin bodies 411, the flow path on the feed side is narrowed. However, since the resin bodies 411 are overlaid on each other to cross one another as shown in FIG. 5, such falling can be suppressed.

Figure 6:
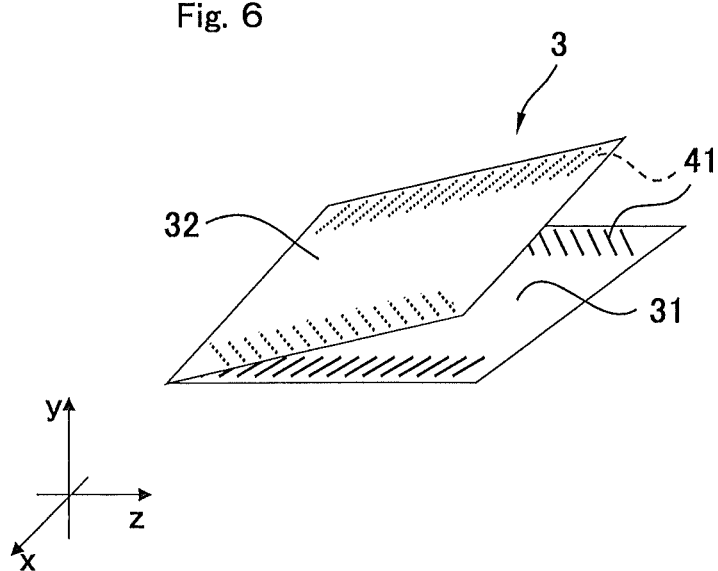
FIG. 6 is a perspective view showing a separation membrane folded with a feed-side surface facing inward.
Figure 7A:
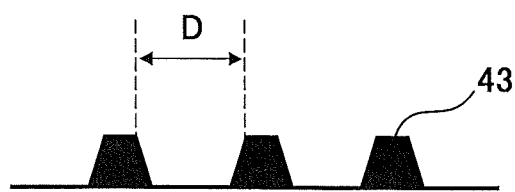
FIG. 7A is a sectional view showing an example of the channel material on the feed side.
Figure 7B:
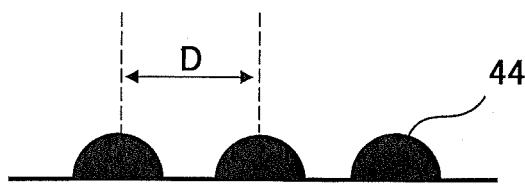
FIG. 7B is a sectional view showing another example of the channel material on the feed side.
Figure 7C:
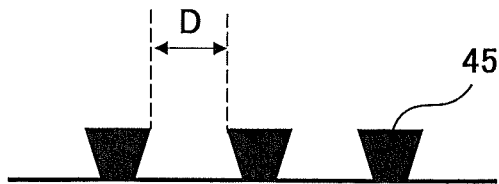
FIG. 7C is a sectional view showing still another example of the channel material on the feed side.
Figure 7D:
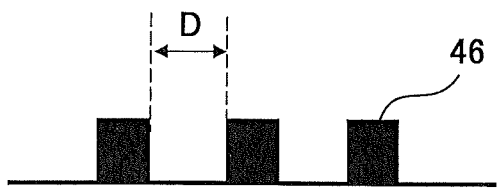
FIG. 7D is a sectional view showing still another example of the channel material on the feed side.

In addition, to overlay the separation membranes 3 on each other in this way, a separation membrane 3 may be folded with the feed-side surface 31 facing inward as shown in FIG. 6, or two separation membranes 3 may be bonded to each other such that the feed-side surfaces 31 are opposed to each other. As described above, when the separation membrane 3 is folded, the channel material 41 is arranged at a location other than a crease and the vicinity thereof.

Second Example

Another example of the first region and the second region will be described with reference to FIG. 8. Elements to which previously described constitutions are applied are given like symbols, and explanations thereof will be omitted. In this example, the channel material on the feed side is disposed at three points. As described above, since three or more first regions exist, the rigidity of the separation membrane element is further enhanced.

Figure 8:
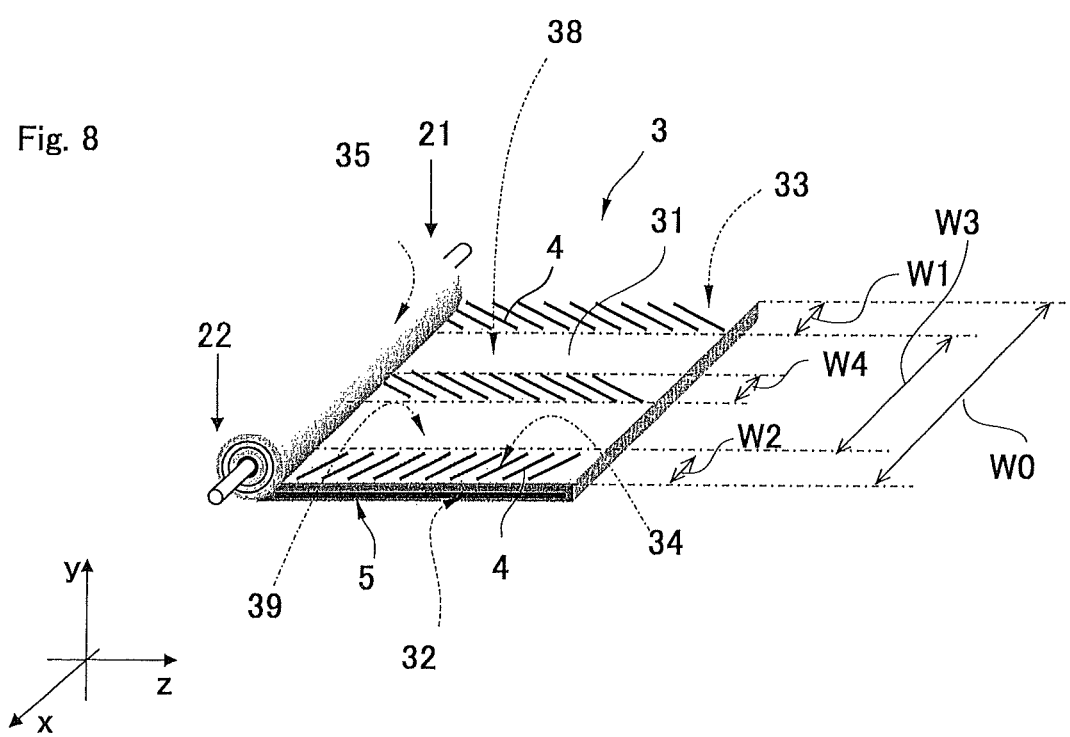
FIG. 8 is a developed perspective view of a spiral separation membrane element in a second example.

As shown in FIG. 8, in this example, the separation membrane element further includes a third band-shaped region 35 as the first region in addition to the band-shaped regions 33 and 34. The shape and the size of the band-shaped region 35 are the same as those of the band-shaped regions 33 and 34. The band-shaped region 35 is disposed in parallel with the band-shaped regions 33 and 34. Moreover, the band-shaped region 35 is disposed at the center of the separation membrane in the direction of an x-axis. Also, the band-shaped region 35 is disposed to be continuous from the outer side to the inner side of the separation membrane 3 in the winding direction.

Spaces between the band-shaped regions 33 to 35 are regions which correspond to the second region and are regions 38 and 39 where the channel material is not provided. That is, the first region and the second region are alternately arranged in the direction of an x-axis.

Since the channel material 4 is thus disposed on the whole separation membrane except the regions 38 and 39 that are the second region, the rigidity is imparted to the separation membrane over the entire length in the winding direction, as described above.

Other Examples (a) The number of the first regions and the number of the second regions are not limited to those in the first and second examples. For example, in one separation membrane, the first region may be disposed at only one point, or may be disposed at four or more points.
(b) In the first and second examples, the widths of the first regions 33 to 35 are constant, and the regions 33 and 34 are in parallel with each other and the first regions 33 to 35 are also in parallel with one another. Therefore, in the first and second examples, the proportion of the area of the first regions in the separation membrane agrees with the pro-portion of the total of the widths of the first regions in the width W0 of the separation membrane. Further, a ratio between the total value of the widths W1 and W2 of the first regions (further a width W4) and the total value of the widths of the second regions agrees with a ratio between the area of the first regions and the area of the second regions.

As described above, widths or areas of at least two first regions are preferably the same. However, this disclosure is not limited to this configuration, and two or more first regions may have areas or widths which are different from one another. Further, when two or more first regions are disposed, these do not have to be in parallel with one another. This is also true for the second region.

(c) In the first and second examples, the shapes of the band-shaped regions 33 to 35 are the same. However, when two or more first regions are disposed, all of the first regions may have different shapes, or at least two first regions preferably have the same shape.

(d) The width of one first region does not have to be constant. However, even when the width of the first region is not constant, or two or more first regions are not parallel with one another, the value ranges of the ratio of the area and the ratio of the width, respectively described above, can be applied. This is also true for the second region.

(e) When two or more first regions are disposed, it is preferred that the first region, the second region, and the first region are placed in this order in the axial direction of the water collection tube. The above-mentioned first and second examples are specific examples of such a constitution.

(f) An element prepared by applying each of the above-mentioned constitutions alone, or an element prepared by applying the above-mentioned constitutions in combination are also included in the technical scope of this disclosure.

3. Permeate-Side Channel Material

The channel material 5 on the permeate side (hereinafter, sometimes referred to simply as a "channel material") may be formed in such a way that the permeate fluid can reach a holed water collection tube, and the shape, size and material of the channel material 5 on the permeate side are not limited to specific constitutions.

In this example, the channel material 5 on the permeate side is made of a material which is different from that of the separation membrane. The phrase "the channel material 5 on the permeate side is made of a material which is different from that of the separation membrane" includes the case where the composition of the channel material 5 on the permeate side is different from that of the separation membrane. The expression the composition of the channel material 5 on the permeate side "is different from that of the separation membrane" means that when the separation membrane has a three-layer structure of a separation functional layer, a support layer and a substrate, the composition of the channel material 5 on the permeate side is different from the composition of any layer of the three layers. The expression "the composition is different" means that the chemical composition is different, and includes that at least part of components contained are different, and that the contents of the components contained are different even when the components contained are the same. Particularly, a compound which is a main component of the channel material 5 on the permeate side may be different from a compound which is a main component of each layer in the separation membrane. Further, the morphology that the composition is different also includes the case where the channel material 5 on the permeate side contains at least part of a component constituting the support layer and at least part of a component constituting the substrate.

For example, when the composition of the channel material 5 on the permeate side is different from that of the separation membrane, the channel material 5 on the permeate side can exhibit higher resistance to pressure than the separation membrane. Specifically, the channel material 5 on the permeate side is preferably formed of a material having a shape retaining force which is higher than that of the separation membrane particularly against a pressure in a direction perpendicular to a face direction of the separation membrane. Thereby, the channel material 5 on the permeate side can secure a flow path on the permeate side even after having undergone repeated water flow or water flow at high pressure.

The channel material 5 on the permeate side may be disposed to allow separation of the fluid by the separation membrane to proceed. That is, the channel material 5 on the permeate side may be disposed such that part of the separation membrane is exposed to be in contact with the fluid and the fluid can move while being in contact with the separation membrane. That is, the channel material 5 on the permeate side has a different shape from that of the separation membrane in the face direction of the separation membrane.

For example, a coarse net-like material, a rod-like, column-like or dot-like material, a foamed material, a powdery material, or a combination thereof can be used for the channel material 5 on the permeate side. The composition of the material is not particularly limited, but in view of chemical resistance, preferred are an ethylene-vinyl acetate copolymer resin, polyolefins such as polyethylene and polypropylene, copolymerized polyolefins, and resins such as polyester, urethane and epoxy resins. Not only thermoplastic resins but also thermosetting or photocurable resins can be used. These materials can be used singly or as a mixture of two or more thereof. If a thermoplastic resin is used, the shape of a channel material can be made uniform because of ease of forming.

A composite material containing these resins as a base material and further containing a filler can also be applied. The compressive elasticity modulus of the channel material can be enhanced by adding a filler such as a porous inorganic substance to the base material. Specifically, silicate salts of alkaline-earth metals such as sodium silicate, calcium silicate and magnesium silicate; metal oxides such as silica, alumina and titanium oxide; and carbonate salts of alkaline-earth metals such as calcium carbonate and magnesium carbonate can be used as the filler. In addition, the amount of the filler is not particularly limited as long as the desired effect is not impaired.

The separation membrane 3, more specifically the substrate may be impregnated with a component of the channel material 5 on the permeate side. When the channel material 5 is located on the substrate side of the separation membrane, that is, on the permeate side of the separation membrane and the channel material 5 is heated from the substrate side by a hot-melt method, impregnation of the channel material 5 on the permeate side proceeds from the backside toward the front side of the separation membrane. Adhesion between the channel material and the substrate becomes firm as the impregnation proceeds and, therefore, the channel material is hardly peeled off from the substrate even in pressurized filtration.

However, when impregnation with a component of the channel material 5 on the permeate side reaches up to the vicinity of the separation functional layer (feed-side surface 31), the channel material permeating breaks the separation functional layer in pressurized filtration. Therefore, when the substrate is impregnated with the component of the channel material 5 on the permeate side, the rate of the impregnation thickness (i.e., impregnation rate) of the channel material 5 on the permeate side to the thickness of the substrate is preferably 5% or more and 95% or less, more preferably 10% or more and 80% or less, and further preferably 20% or more and 60% or less. In addition, the impregnation thickness refers to the maximum thickness of impregnation with the channel material, and the maximum thickness of impregnation with the channel material means the maximum value of the thickness of an impregnated portion corresponding to the channel material in one cross-section.

The impregnation thickness of the channel material 5 on the permeate side can be adjusted, for example, by changing the type of the material constituting the channel material 5 on the permeate side (more specifically, the type of the resin) and/or the amount of the material constituting the channel material 5 on the permeate side. When the channel material 5 on the permeate side is disposed by the hot-melt method, the impregnation thickness can also be adjusted by changing the treatment temperature.

In addition, when a peak resulting from the component of the channel material 5 on the permeate side is obtained separately from the substrate by subjecting a substrate including the impregnated portion of the channel material 5 on the permeate side to a thermal analysis such as differential scanning calorimetry, it can be confirmed that the substrate is impregnated with the channel material 5.

The impregnation rate of the substrate with the channel material 5 can be determined by observing a cross-section of the separation membrane where the channel material 5 is present by using a scanning electron microscope, a transmission electron microscope or an atomic force microscope, and calculating the impregnation thickness of a portion impregnated with the channel material and the substrate thickness. For example, when the separation membrane is observed by using a scanning electron microscope, the separation membrane is cut in a direction of depth together with the channel material 5, and the cross-section is observed with the scanning electron microscope to measure the impregnation thickness of the portion impregnated with the channel material and the substrate thickness. Then, the impregnation rate can be determined by calculating the ratio of the thickness of the portion which is most abundantly impregnated with the channel material 5 in the substrate, that is, the maximum thickness of impregnation with the channel material, to the substrate thickness. The "substrate thickness" in determining the depth of impregnation is the thickness of the substrate at the same point as the portion where the maximum thickness of impregnation is measured.

The channel material 5 on the permeate side may have a continuous morphology, or may have a discontinuous morphology.

Examples of a member having a continuous morphology used as the channel material 5 on the permeate side include the tricot previously described. The definition of continuity is previously described. Other examples of a member having a continuous morphology include woven cloths, fabrics (net and the like), nonwoven fabrics, and porous materials (porous film and the like).

The definition of discontinuity is as previously mentioned. Specific examples of the shape of the discontinuous channel material include a dot, a particle, a line, a hemisphere, a column (including a circular column, a prism and the like), and a wall-like body. A plurality of linear or wall-like channel materials disposed on one separation membrane may be arranged not to cross one another, and specifically they may be arranged in parallel with one another.

The shape of each resin body constituting the channel material on the permeate side arranged in the discontinuous morphology is not particularly limited, but it is preferred to reduce the flow resistance in the flow path of the permeate fluid and stabilize the flow path during supply of the raw fluid to the separation membrane element and permeation of the raw fluid. Examples of the shape in a plan view at the time when one unit of the channel material on the permeate side arranged in the discontinuous morphology is observed from a direction perpendicular to the permeate-side surface of the separation membrane include ellipse, circle, oval, trapezoid, triangle, rectangle, square, parallelogram, rhombus, and indeterminate forms. Further, in a cross-section perpendicular to the face direction of the separation membrane, the channel material on the permeate side may have any of the forms in which the width of the channel material broadens, narrows, and are constant from an upper part toward a lower part (that is, from an apex of the channel material on the permeate side in the thickness direction toward the separation membrane where the channel material on the permeate side is disposed).

The thickness of the channel material on the permeate side in the separation membrane element is preferably 30 μm or more and 1000 μm or less, more preferably 50 μm or more and 700 μm or less, and further preferably 50 μm or more and 500 μm or less, and when the thickness is in this range, a stable flow path of the permeate fluid can be secured.

For example, when the channel material on the permeate side is arranged in the discontinuous morphology by a hot-melt method, the thickness of the channel material on the permeate side can be freely adjusted to satisfy the conditions of required separation properties or permeation performance by changing the treatment temperature or the type of the resin for hot-melt to be selected.

The thickness of the channel material on the permeate side can be measured by using a commercially available shape measurement system or the like. For example, the thickness can be measured by the thickness measurement from a cross-section by a laser microscope, or by using high precision shape measurement system KS-1100 manufactured by KEYENCE CORPORATION. The measurement of the thickness is conducted at any point where the channel material on the permeate side is present, and the thickness can be determined by summing up the measured values of the thickness and dividing the sum by the number of points measured.

4. Separation Membrane

Overview of Constitution of Separation Membrane

The separation membrane can separate components in the raw fluid.

The separation membrane, for example, may include i) a substrate, a separation functional layer, and a porous support layer arranged between the substrate and the separation functional layer, or may include ii) a separation functional layer and a substrate, and no porous support layer between the substrate and the separation functional layer. In addition, the separation membrane in the above ii) may include, as a separation functional layer, a layer which has a constitution similar to that of the porous support layer in the separation membrane in the above i).

The separation membrane includes a feed-side surface and a permeate-side surface. When a raw fluid is supplied to the feed-side surface, the raw fluid is separated into a permeate fluid which permeates the separation membrane and moves to a surface side, and a concentrate fluid which stays at the feed-side surface.

Separation Functional Layer

In the separation membrane in the form of the above paragraph i), as the material used for the separation functional layer, a crosslinkable polymer is used, for example, in view of the control of the pore size and the durability. Specifically, in view of separation performance, a polyamide separation functional layer formed by polycondensing a polyfunctional amine and a polyfunctional acid halide on a porous support layer as described later, and an organic-inorganic hybrid functional layer are suitably used.

The separation functional layer in the separation membrane in the above paragraph i) may contain polyamide as a main component. The separation membrane is suitably used, for example, in the production of drinking water from sea water, brackish water, water containing toxic substances, and the like, as well as in the production of industrial ultra-pure water. Polyamide is, for example, a polycondensate of a polyfunctional amine and a polyfunctional acid halide.

When "a composition X contains a substance Y as the main component," the content of the substance Y in the composition X is preferably 50% by weight or more, more preferably 60% by weight or more, and particularly preferably 80% by weight or more. Further, the composition X may be formed substantially only of the substance Y. A concept of composition includes mixtures, composite materials, and compounds.

The constitution of the polyamide, and the polyfunctional amine and the polyfunctional acid halide are exemplified in the section of production method. Moreover, the separation functional layer, which constitutes the separation membrane in the above paragraph i), may have an organic-inorganic hybrid structure containing a Si element in view of chemical resistance. The composition of the separation functional layer with an organic-inorganic hybrid structure is not particularly limited and, for example, the separation functional layer can contain a polymerization product of (A) a silicon compound in which a reactive group having an ethylenic unsaturated group and a hydrolyzable group are directly bonded to the silicon atom, and/or (B) a compound having an ethylenic unsaturated group other than the silicon compound.

That is, the separation functional layer may contain at least one polymerization product of:
  a polymerization product formed by condensation and/or polymerization of only the compound (A);
  a polymerization product formed by polymerization of only the compound (B); and
  a copolymer of the compound (A) and the compound (B).
In addition, the polymerization product includes a condensate. Further, the compound (A) may be condensed through a hydrolyzable group in the copolymer of the compound (A) and the compound (B). The compound (B) can be polymerized through an ethylenic unsaturated group.

In the separation functional layer, the content of the compound (A) is preferably 10% by weight or more, and more preferably 20% by weight or more and 50% by weight or less. In the separation functional layer, the content of the compound (B) is preferably 90% by weight or less, and more preferably 50% by weight or more and 80% by weight or less. Further, a weight ratio between the compound (A) and the compound (B) may be 1:9 to 1:1. In this range, since a relatively high degree of crosslinking is obtained in a polycondensation product contained in the separation functional layer, elution of the component from the separation functional layer is suppressed during filtration with a membrane, and consequently stable filtration performance is realized.

In addition, the compound (A), the compound (B) and another compound may form a compound such as a polymer (including a condensate). Accordingly, when discussing, for example, about "the content of the compound (A) in the separation functional layer," the amount of the compound (A) includes the amount of the component derived from the compound (A) in the polycondensate. This is also true for the compound (B) and another compound.

Further, the separation functional layer does not have the reactive group containing an ethylenic unsaturated group other than the compound (A), but may contain a component derived from the silicon compound (C) containing a hydrolyzable group. Examples of such a compound (C) will be described later.

These compounds (C) may be contained as a condensate of only the compound (C), or may be contained as a condensate of the compound (C) and a polymer of the compound (A) and the compound (B).

Next, the separation functional layer constituting the separation membrane in the above paragraph ii) will be described in detail. The separation membrane in the above paragraph ii) is suitably employed in sewage disposal.

The separation functional layer in the separation membrane in the above paragraph ii) is not particularly limited as long as it has both of a separation function and mechanical strength and, for example, the separation functional layer is formed from cellulose, a polyethylene resin, a polypropylene resin, a polyvinyl chloride resin, a polyvinylidene fluoride resin, a polysulfone resin, a polyether sulfone resin, a polyimide resin, or a polyether imide resin. In addition, the separation functional layer may contain these resins as a main component.

Particularly, as the main component of the separation functional layer, a polyvinyl chloride resin, a polyvinylidene fluoride resin, a polysulfone resin, and a polyether sulfone resin, which are easy to form a membrane by use of a solution and excellent in physical durability and chemical resistance, are preferred.

The separation functional layer, as described later, can be produced by casting, for example, a N,N-dimethylformamide (hereinafter, stated as DMF) solution of polysulfone in a certain thickness on a substrate described later, that is, a nonwoven fabric, and wet-coagulating the resultant in water.

In the separation membrane in the above paragraph ii), the average pore size at one surface of the porous resin layer (i.e., the separation functional layer) may be two times or more larger than that at the other surface.

In any separation functional layer, the thickness of the layer is not limited. The separation membrane in the above paragraph i) is suitably employed, for example, in a reverse osmosis membrane, a forward osmosis membrane, and a nanofiltration membrane. In these cases, the thickness of the separation functional layer is preferably 5 nm or more and 3000 nm or less in view of the separation performance and the permeation performance, and the thickness is particularly preferably 5 nm or more and 300 nm or less in view of the permeation performance.

Further, in the separation membrane in the above paragraph i), the thickness of the separation functional layer may be measured in accordance with a conventional method of measuring the thickness of a separation membrane and, for example, it can be measured by preparing an ultrathin section by embedding the separation membrane in a resin, subjecting the resulting thin section to staining or other treatments, and observing the thin section with a transmission electron microscope. As a principal measurement method, when the separation functional layer has a pleated structure, the thickness can be determined by measuring the thickness in the longitudinal cross-sectional direction of the pleat structure for 20 pleats present above the porous support layer at an interval of 50 nm, and calculating the average from the 20 measurements.

On the other hand, in the case of the separation membrane in the form of the above paragraph ii), the thickness of the separation functional layer is preferably 1 μm or more, and more preferably 5 μm or more. The thickness of the separation functional layer is preferably 200 μm or less, and more preferably 500 μm or less. When the thickness of the separation functional layer is 1 μm or more, since the defects such as cracks are hardly produced in the separation functional layer, filtration performance is maintained. When the thickness of the separation functional layer is 500 μm or less, good permeation performance can be maintained.

Porous Support Layer

The porous support layer provides mechanical strength for the separation membrane. The pore size and pore distribution in the porous support layer are not particularly limited, and the porous support layer does not have to have the separation performance for a component with a small molecular size such as ions. Specifically, the porous support layer may be the one commonly referred to as a "porous support membrane," and the porous support layer refers to a layer having, for example, uniform fine pores, or fine pores whose size gradually increases from the surface on a side where the separation functional layer is formed to the surface on the other side. Preferably, a porous support layer, in which a projected area diameter of the fine pore measured from the surface where the separation functional layer is formed by using an atomic force microscope, an electron microscope or the like is 1 nm or more and 100 nm or less, is used. Particularly, it is preferred to have a projected area diameter of 3 nm or more and 50 nm or less in view of the reactivity in the interfacial polymerization and retention of the separation functional layer.

The thickness of the porous support layer is not particularly limited, but it is preferably 20 μm or more and 500 μm or less, and more preferably 30 μm or more and 300 μm or less in view of the strength of the separation membrane, provision of the height difference with the separation membrane, and morphological stability of the flow path on the feed side.

The morphology of the porous support layer can be observed by using a scanning electron microscope, a transmission electron microscope or an atomic force microscope. For example, when the porous support layer is observed by using a scanning electron microscope, the observation may be conducted by peeling the porous support membrane off the substrate (non-woven fabric), and preparing a sample for observing the cross-section by cutting the porous support membrane by freeze fracturing. This sample is thinly coated with platinum or platinum-palladium or ruthenium tetrachloride, and preferably ruthenium tetrachloride, and observed at an acceleration voltage of 3 kV to 6 kV by using a high resolution field emission scanning electron microscope (UHR-FE-SEM). As the high resolution field emission scanning electron microscope, Model S-900 electron microscope manufactured by Hitachi, Ltd. can be employed. The film thickness of the porous support layer and the projected area diameter on the surface are determined from the resulting electron micrograph. The thickness of the support layer and the pore size thus obtained are average values. In addition, the thickness of the porous support layer is the average of 20 points obtained by observing the cross-section, and measuring 20 points at an interval of 20 μm in the direction perpendicular to the thickness direction of the membrane. The pore size is an average value of the projected area diameters obtained by measuring 200 holes.

The material of the porous support layer is preferably polysulfone, cellulose acetate, polyvinyl chloride, an epoxy resin, or a mixture or a laminate thereof, and use of polysulfone is preferable since it has high chemical, mechanical and thermal stability and makes control of the pore size easy.

As described above, there may be cases where a layer having the same constitution as in the porous support layer described in these columns is disposed on the substrate as a separation functional layer. In this case, the pore size or the like of the porous support layer is set according to a substance to be separated.

Substrate

Next, as a substrate, a nonwoven fabric of a fibrous substrate may be used in view of retaining the separation and permeation performance of the separation membrane, providing appropriate mechanical strength, and controlling height difference of the surface of the separation membrane.

Examples of the material of the nonwoven fabric include polyolefins, polyesters, and cellulose, and a polyolefin or a polyester is preferably used in view of providing the height difference for the surface of the separation membranes and retaining the morphology of the separation membranes. Also, a substrate formed by mixing a plurality of materials can be employed.

A long fiber nonwoven fabric or a short fiber nonwoven fabric can be preferably employed as the substrate. The substrate preferably satisfies requirements that when a solution of a high molecular weight polymer is cast on the substrate, the solution of a high molecular weight polymer hardly permeates to the backside (permeate side) of the substrate, that the porous support layer is hardly peeled off, that the membrane hardly becomes non-uniform due to fuzz of the substrate, and that the defect such as a pinhole is hardly produced. Therefore, the long fiber nonwoven fabric is particularly preferably used as the substrate. The substrate may be a long fiber nonwoven fabric composed of, for example, thermoplastic continuous filaments. Furthermore, since a tensile force is applied to a direction of membrane forming of the separation membrane when the separation membrane is continuously formed, it is preferred to use a long fiber nonwoven fabric having excellent dimensional stability as the substrate. Particularly, in the separation membrane in the form of the above paragraph i), the long fiber nonwoven fabric is preferred in view of strength and cost, and further a polyester long fiber nonwoven fabric is preferred in view of the formability of a substrate.

In the long fiber nonwoven fabric, it is preferred in view of formability and strength that fibers at the surface layer opposite to the porous support layer-side surface layer are more vertically oriented than those at the porous support layer-side surface layer. When such a structure is employed, it is possible to suppress membrane break more effectively by maintaining strength. Moreover, by such a structure, the formability of a laminate including a porous support layer and a substrate is improved and the morphology of the projections and depressions of the separation membrane is stabilized. More specifically, the fiber orientation degree of the long fiber nonwoven fabric at the surface layer opposite to the porous support layer-side surface layer is preferably 0° to 25°, and the difference between this fiber orientation degree and a fiber orientation degree at the porous support layer-side surface layer is preferably 10° to 90°.

The production step of the separation membrane or the production step of the element includes a heating step. A phenomenon occurs in which the porous support layer or the separation functional layer is shrunk by heating. The shrinkage is significant particularly in a width direction for which a tensile force is not provided in continuous membrane forming. When the membrane is shrunk, since a problem of dimensional stability or the like arises, a substrate having a small thermal change rate of dimension is desired. When the difference between the fiber orientation degree at the surface layer opposite to the porous support layer-side surface layer and the fiber orientation degree at the porous support layer-side surface layer is 10° to 90° in the nonwoven fabric, it is preferred since changes in a width direction due to heat can also be suppressed.

The fiber orientation degree is an index of orientation of fibers of a nonwoven fabric substrate constituting the porous support layer, and the fiber orientation degree refers to an average angle of fibers constituting the nonwoven fabric substrate at the time when a membrane-forming direction in continuously producing a membrane is take as 0°, and a direction orthogonal to the membrane-forming direction, that is, the width direction of the nonwoven fabric substrate is taken as 90°. Therefore, it is shown that the closer to 0° the fiber orientation degree is, the more the fibers are vertically oriented, and the closer to 90° the fiber orientation degree is, the more the fibers are horizontally oriented.

With respect to the fiber orientation degree, the fiber orientation degree is determined by taking 10 small samples at random from a nonwoven fabric, photographing the surfaces of these samples at a magnification of 100 times to 1000 times by using a scanning electron microscope, selecting ten fibers from each sample and measuring angles of a total of 100 fibers at the time when the longitudinal direction (machine direction, direction of membrane formation) of the nonwoven fabric is taken as 0° and the width direction (transverse direction) of the nonwoven fabric is taken as 90°, and calculating the average value of the 100 measured angles and determining the value as a fiber orientation degree by rounding the resulting average value to the closest whole number.

In addition, each of the substrate, the porous support layer and the separation functional layer, contained in the separation membrane, may contain additives such as a coloring agent, an antistatic agent, and a plasticizer at a ratio of 5% by weight or less, 2% by weight or less or 1% by weight or less besides the above-mentioned components.

Projections and Depressions

From the viewpoint of improving the separation performance, permeation performance and formation of a flow path on the raw fluid side of the separation membrane element, a height difference may be formed on the feed-side surface or the permeate-side surface of the separation membrane 3. "A height difference is formed" on the separation membrane means that the separation membrane is formed in such a way that the separation membrane itself has projections and depressions.

The height difference may fall within a range of 100 µm or more and 2000 µm or less. Particularly, when the height difference is provided on the feed-side surface, it is also possible to create a turbulence effect in a portion where a resin is not disposed. Consequently, concentration polarization is suppressed. The height difference is preferably 200 µm or more and 1500 µm or less, and more preferably 200 µm or more and 1000 µm or less to further stabilize the flow path on the feed side of the element and improve the separation performance and the permeation performance.

The height difference of the surface of the separation membrane 3 or the surface of the separation functional layer can be measured by using a commercially available shape measurement system or the like. For example, the height difference can be measured by height-difference measurement from a cross-section by a laser microscope, or by using high precision shape measurement system KS-1100 manufactured by KEYENCE CORPORATION.

While the height difference, that is, the shape of projection and depression is not particularly limited, but it can be selected from the shape in which the flow resistance in the flow path is reduced and the flow path is stabilized during supply of the fluid to the separation membrane element and permeation of the fluid. From the point of view, the height difference of the separation membrane, that is, the shape of the projection portion or the depression portion, is selected, for example, from ellipse, circle, oval, trapezoid, triangle, rectangle, square, parallelogram, rhombus, and indeterminate forms in a face direction of the membrane. Further, in the thickness direction of the separation membrane, a projection portion or a depression portion may have any of the forms in which the width broadens, narrows, and are constant from an upper part toward a lower part when either surface of the separation membrane is faced up. When a half of the height difference is taken as a reference position, the area of a projection portion positioned above the reference position is preferably 5% or more and 80% or less of the entire membrane area in terms of the area (two-dimensional area) observed from a direction perpendicular to the membrane face, and particularly preferably 10% or more and 60% or less in view of the flow resistance and flow path stability.

The height difference of the separation membrane is preferably provided in the second region. That is, it is preferred that in the central region 37 and the second regions 38 and 39, the separation membrane is provided with projections and depressions, and in the band-shaped regions 33 to 35 that are the first regions, the separation membrane is flat. As described above, when the location of the separation membrane, in which the channel material on the feed side is arranged, is not provided with projections and depressions, arrangement of the channel material is easily performed.

5. Production of Separation Membrane Element 5-1. Production of Separation Membrane Formation of Porous Support Layer in Paragraph i) and Separation Functional Layer in Paragraph ii)

The porous support layer in the separation membrane in the above paragraph i) and the separation functional layer in the separation membrane in the above paragraph ii) are collectively called a "porous resin layer" in the following description.

As a specific example of a method of forming the porous resin layer, a method including the step of dissolving a resin in a good solvent, the step of casting the resulting resin solution on a substrate, and the step of bringing the resin solution into contact with a non-solvent will be described. In this method, first, a coating of a raw solution containing the resin and the solvent, respectively described above, is formed on the surface of a substrate (e.g., a nonwoven fabric) and the substrate is impregnated with the raw solution. Thereafter, only the coating-side surface of the substrate having the coating is brought into contact with a coagulation bath including a non-solvent to coagulate the resin and, thereby, a porous resin layer as a separation functional layer is formed on the surface of the substrate. Preferably, the temperature of the raw solution is usually selected within 0 to 120° C. from the viewpoint of film forming property.

The type of the resin is as previously mentioned.

The solvent is a substance in which a resin is soluble. The solvent acts on the resin and a pore opening agent to promote the formation of a porous resin layer from the resin and the pore opening agent. As the solvent, N-methylpyrrolidinone (NMP), N,N-dimethylacetamide (DMAc), N,N-dimethylformamide (DMF), dimethyl sulfoxide (DMSO), acetone, methyl ethyl ketone and the like can be used. Among these, NMP, DMAc, DMF, and DMSO, in which the solubility of the resin is high, can be preferably used.

A pore opening agent may be added to the raw solution. The pore opening agent has an action of making the resin layer porous since it is extracted when being immersed in the coagulation bath. The pore opening agent is preferably one having high solubility in the coagulation bath. For example, an inorganic salt such as calcium chloride or calcium carbonate can be employed. Further, the pore opening agent may be selected from among polyoxyalkylenes such as polyethylene glycol and polypropylene glycol; water-soluble polymers such as polyvinyl alcohol, polyvinyl butyral, and polyacrylic acid; and glycerin.

A non-solvent may also be added to the raw solution. The non-solvent is a liquid in which a resin is not soluble. The non-solvent acts to control the size of the fine pore by controlling the rate of coagulation of the resin. As the non-solvent, water and alcohols such as methanol and ethanol can be used. Among these, water and methanol are preferred in view of ease of waste water treatment and a price. The non-solvent may be a mixture thereof.

The concentration of the resin in the raw solution is, for example, 5 to 40% by weight, or 8 to 25% by weight. The concentration of the solvent is, for example, 40 to 95% by weight, 55 to 94.9% by weight, or 60 to 90% by weight. When the amount of the resin is extremely small, strength of the porous resin layer may be low, and when the amount of the resin is too large, water permeability may be deteriorated. When the amount of the solvent is too small, the raw solution is easily gelated, and when the amount of the solvent is too large, strength of the porous resin layer may be reduced.

Particularly, when the pore opening agent and the non-solvent are added, the content of the resin in the raw solution is preferably 5 to 40% by weight, and the content of the solvent is preferably 40 to 94.9% by weight. The content of the pore opening agent in the raw solution is preferably 0.1 to 15% by weight. The content of the pore opening agent is more preferably 0.5 to 10% by weight. Further, the content of the non-solvent is preferably 0 to 20% by weight, and more preferably 0.5 to 15% by weight.

When the amount of the pore opening agent is too small, water permeability may be deteriorated, and when the amount is too large, strength of the porous resin layer may be reduced. Further, when the amount of the pore opening agent is extremely large, the pore opening agent can remain in the porous resin layer. The remaining pore opening agent may deteriorate water quality of the permeate water, or may cause fluctuation of water permeability due to the elution of the remaining pore opening agent during use.

As the coagulation bath, a mixed solution containing the non-solvent, or the non-solvent and the solvent can be used. The content of the solvent in the coagulation bath is, for example, 40 to 95% by weight, and more specifically 50 to 90% by weight. The coagulation bath preferably contains the non-solvent in an amount of at least 5% by weight. When the content of the solvent is less than 40% by weight, the coagulation rate of the resin is increased and therefore the fine pore size becomes small. Further, when the content of the solvent is more than 95% by weight, the resin hardly coagulates, and the porous resin layer is hardly formed.

The coagulation rate can be adjusted by the temperature of the coagulation bath. The temperature of the coagulation bath is, for example, 0 to 100° C., or 10 to 80° C.

A method of bringing only the coating-side surface of the substrate having the coating into contact with the coagulation bath is not particularly limited. For example, a method in which the coating-side surface of the substrate having the coating is faced down to bring the substrate into contact with the coagulation bath, or a method in which a side opposite to the coating side is brought into contact with a smooth plate such as a glass plate or a metal plate and bonded to the plate such that the coagulation bath will not come around behind the substrate, and the substrate having the coating is immersed in the coagulation bath may be employed. In the latter method, the coating of the raw solution may be formed after the substrate is bonded to a plate, or the substrate may be bonded to the plate after the coating of the raw solution is be formed on the substrate.

Formation of the coating of the raw solution on the substrate is conducted by applying the raw solution to the substrate or by immersing the substrate in the raw solution. In the case where the raw solution is applied, the raw solution may be applied to one surface of the substrate, or may be applied to both surfaces thereof. In this case, depending on the composition of the raw solution, when a porous substrate having a density of 0.7 g/cm$^3$ or less is used, the porous substrate is moderately impregnated with the raw solution.

In the separation membrane thus produced, an average pore size of the surface on a side in contact with the coagulation bath is two times or more larger than that of the other surface in the porous resin layer (i.e., the separation functional layer). The reason for this is as follows: since the coagulation bath includes the solvent in an amount of 40 to 95% by weight, the rate of replacement of the raw solution with the coagulation bath is relatively low, and growth of holes proceeds to increase the fine pore size in the surface on a side in contact with the coagulation bath in the porous resin layer, whereas since the surface opposite to the above surface is not brought into contact with the coagulation bath, the hole is formed only by phase separation of the raw solution, and the fine pore size becomes relatively small. Therefore, the separation membrane thus obtained may be used with a side brought into contact with the coagulation bath designated as a side of solution to be treated, and with the other side designated as a side of permeate solution.

A specific formation method of the separation membrane will be described. A predetermined amount of polysulfone is dissolved in DMF to prepare a polysulfone resin solution (raw solution) having a predetermined concentration. Then, the raw solution is applied onto a substrate made of a nonwoven fabric in a substantially constant thickness, and after the substrate is left for a predetermined period in the air to remove the solvent on the surface, the polysulfone is coagulated in the coagulation solution. During this process, in the surface portion in contact with the coagulation solution, rapid coagulation of the polysulfone takes place simultaneously with the rapid volatilization of DMF as the solvent, and mutually communicating fine pores are formed with the space where DMF has been present as a core.

In the meanwhile, since both the volatilization of DMF and the coagulation of the polysulfone proceed more slowly than in the surface region in the interior between the surface portion and the side of the substrate, DMF tends to agglutinate to form larger cores and, therefore, the size of the resulting mutually communicating pores becomes larger. Naturally, the conditions of such core formation gradually change with the distance from the membrane surface, and therefore a layer with a smooth pore size distribution with no clear boundary is formed. It is possible to control the average porosity and the average pore size by adjusting the temperature and the polysulfone concentration of the raw solution, relative humidity of the atmosphere used in the application, time interval between the application and the immersion in the coagulation solution, temperature and composition of the coagulation solution and the like, which are used in the step of membrane formation.

Details of the above-mentioned step or conditions not particularly referred to can be performed according to, for example, the method described in "Office of Saline Water, Research and Development Progress Report," No. 359 (1968). However, to obtain the layer having a desired structure, the polymer concentration, the solvent temperature, and the poor solvent can be changed.

Formation of Separation Functional Layer in Paragraph i)

The separation functional layer constituting the separation membrane in the above paragraph i) can be produced in the following way.

The separation functional layer mainly made of polyamide may be formed by inter-facial polycondensation of a polyfunctional amine and a polyfunctional acid halide on the porous support layer. Herein, as at least one of the polyfunctional amine and the polyfunctional acid halide, at least one type of compound having a functionality of three or more is preferably used.

The polyfunctional amine refers to an amine containing at least two primary and/or secondary amino groups in a molecule, wherein at least one of the amino groups is a primary amino group.

Examples of the polyfunctional amines include aromatic polyfunctional amines such as phenylenediamine, xylylenediamine, 1,3,5-triaminobenzene, 1,2,4-triaminobenzene, 3,5-diaminobenzoic acid, 3-aminobenzylamine, and 4-aminobenzylamine in which the two amino groups are bonded to a benzene ring at any one of ortho-, meta-, and para-positions; aliphatic amines such as ethylenediamine and propylene diamine; and alicyclic polyfunctional amines such as 1,2-diaminocyclohexane, 1,4-diaminocyclohexane, 4-aminopiperidine, and 4-amino-ethylpiperazine.

The preferred as the polyfunctional amine is an aromatic polyfunctional amine having two to four primary and/or secondary amino groups in a molecule in consideration of the selective separation and permeation abilities as well as heat resistance of the membrane. As these polyfunctional aromatic amines, m-phenylenediamine, p-phenylenediamine, and 1,3,5-triaminobenzene are suitably used. Among these, m-phenylenediamine (hereinafter referred to as m-PDA) is more preferable in view of ease of availability and handling.

These polyfunctional amines may be used alone or may be used in combination of two or more thereof. When two or more polyfunctional amines are used in combination, the combination may include the amines as described above or an amine as described above and an amine having at least two secondary amino groups in a molecule. Examples of the amine having at least two secondary amino groups in a molecule include piperazine and 1,3-bispiperidyl-propane.

The polyfunctional acid halide refers to an acid halide having at least two halogenated carbonyl groups in a molecule.

Examples of a trifunctional acid halide include trimesic acid chloride, 1,3,5-cyclohexane tricarboxylic acid trichloride, and 1,2,4-cyclobutane tricarboxylic acid trichloride. Examples of a bifunctional acid halide include aromatic bifunctional acid halides such as biphenyl dicarboxylic acid dichloride, azobenzene dicarboxylic acid dichloride, terephthalic acid chloride, isophthalic acid chloride, and naphthalene dicarboxylic acid chloride; aliphatic bifunctional acid halides such as adipoyl chloride and sebacoyl chloride; and alicyclic bifunctional acid halides such as cyclopentane dicarboxylic acid dichloride, cyclohexane dicarboxylic acid dichloride, and tetrahydrofuran dicarboxylic acid dichloride.

In consideration of the reactivity with the polyfunctional amine, the polyfunctional acid halide is preferably a polyfunctional acid chloride. Further, the polyfunctional acid halide is preferably a polyfunctional aromatic acid chloride having two to four carbonyl chloride groups in a molecule in consideration of the selective separation and heat resistance of the membrane. Particularly, trimesic acid chloride is more preferable from the viewpoint of ease of availability and handling.

These polyfunctional acid halides may be used alone or may be used in combination of two or more thereof.

As the polyfunctional acid halide, bifunctional acid halides and trifunctional acid halides may be used. From the viewpoint of maintaining separation performance of the separation membrane, the molar ratio of the bifunctional acid halide to the trifunctional acid halide (molar number of the bifunctional acid halide/molar number of the trifunctional acid halide) is preferably 0.05 to 1.5, and more preferably 0.1 to 1.0.

A specific method for forming a polyamide layer as the separation functional layer will be described.

A polyfunctional amine aqueous solution is applied onto the porous support layer, and then the excessive amine aqueous solution is removed by an air knife or the like. A solution containing a polyfunctional acid halide is applied thereon and the excessive polyfunctional acid halide is removed by an air knife or the like.

Thereafter, a monomer may be removed by washing. Further, the resulting separation functional layer may be subjected to a chemical treatment by chlorine, an acid, an alkali, nitrous acid or the like. The separation functional layer may be washed after a chemical treatment, or may be subjected to a chemical treatment after washing.

An organic solvent is used for a solvent of the solution containing a polyfunctional acid halide. The organic solvent is preferably a solvent which is immiscible in water but in which the polyfunctional acid halide is soluble without destroying a porous resin. The organic solvent may be the one which is inactive to the polyfunctional amine compound and the polyfunctional acid halide. Preferable examples thereof include hydrocarbon compounds such as n-hexane, n-octane, and n-decane.

Formation of the separation functional layer having an organic-inorganic hybrid structure containing a Si element will be described. As described above, the separation functional layer with an organic-inorganic hybrid structure can be formed by at least one reaction of the condensation of the compound (A) and the polymerization of the compound (A) and the compound (B).

First, the compound (A) will be described.

A reactive group having an ethylenic unsaturated group is directly bonded to the silicon atom. Examples of such reactive groups include a vinyl group, an allyl group, a methacryloxyethyl group, a methacryloxypropyl group, an acryloxyethyl group, an acryloxypropyl group, and a styryl group. In view of polymerizability, the preferred are a methacryloxypropyl group, an acryloxypropyl group, and a styryl group.

The compound (A) becomes a high molecular weight compound by a condensation reaction in which the silicon compounds are bonded to one another by a siloxane bond by undergoing the process such as conversion of the hydrolyzable group directly bonded to the silicon atom into a hydroxyl group.

Examples of the hydrolyzable groups include functional groups such as an alkoxy group, an alkenyloxy group, a carboxy group, a ketoxime group, an aminohydroxy group, a halogen atom, and an isocyanate group. The alkoxy group is preferably the one having 1 to 10 carbon atoms, and more preferably the one having 1 to 2 carbon atoms. The alkenyloxy group is preferably the one having 2 to 10 carbon atoms, more preferably the one having 2 to 4 carbon atoms, and more preferably the one having 3 carbon atoms. The carboxy group is preferably the one having 2 to 10 carbon atoms, and more preferably the one having 2 carbon atoms, namely, an acetoxy group. Examples of the ketoxime group include a methylethylketoxime group, a dimethylketoxime group, and a diethylketoxime group. The aminohydroxy group is the one in which the amino group is bonded to the silicon atom with an oxygen atom interposed therebetween. Examples of such aminohydroxy groups include a dimethylaminohydroxy group, a diethylaminohydroxy group, and a methylethylaminohydroxy group. The halogen atom used is preferably a chlorine atom.

In forming the separation functional layer, also usable is a silicon compound in which the hydrolyzable group has been partly hydrolyzed to take on a silanol structure. Further, a silicon compound, the molecular weight of which is increased to such an extent that two or more silicon compounds are not crosslinked by the hydrolysis and condensation of a part of the hydrolyzable group, can also be used.

The silicon compound (A) is preferably a compound represented by the following general formula (a):

$$Si(R^1)_m(R^2)_n(R^3)_{4-m-n} \quad (a)$$

wherein $R^1$ represents a reactive group containing an ethylenic unsaturated group, $R^2$ represents an alkoxy group, an alkenyloxy group, a carboxy group, a ketoxime group, a halogen atom, or an isocyanate group, $R^3$ is H or an alkyl group, m and n are respectively an integer satisfying $m+n \leq 4$, $m \geq 1$, and $n \geq 1$, and when two or more functional groups are bonded to the silicon atom in each of $R^1$, $R^2$, and $R^3$, the two or more functional groups may be the same or different.

$R^1$ is a reactive group containing an ethylenic unsaturated group, and it is as described above.

$R^2$ is a hydrolyzable group, and it is as described above. The alkyl group of $R^3$ preferably has 1 to 10 carbon atoms, and more preferably has 1 or 2 carbon atoms.

As the hydrolyzable group, an alkoxy group is preferably used since the reaction liquid has viscosity in the formation of the separation functional layer.

Examples of such silicon compounds include vinyltrimethoxysilane, vinyltriethoxy-silane, styryltrimethoxysilane, methacryloxypropylmethyldimethoxysilane, methacryloxypropyl-trimethoxysilane, methacryloxypropylmethyldiethoxysilane, methacryloxypropyltriethoxysilane, and acryloxypropyltrimethoxysilane.

In addition to the compound (A), a silicon compound (C) not having a reactive group containing an ethylenic unsaturated group but having a hydrolyzable group may also be used in combination. Examples of the silicon compound (C) include compounds in which m is zero in the general formula (a) while with respect to the compound (A), m is defined as "$m \geq 1$" in the general formula (a) as described above. Examples of the compound (C) include tetramethoxysilane, tetraethoxysilane, methyltrimethoxysilane, and methyltriethoxysilane.

Next, a compound (B) having an ethylenic unsaturated group other than the compound (A) will be described.

The ethylenic unsaturated group is addition polymerizable. Examples of such compounds include ethylene, propylene, methacrylic acid, acrylic acid, styrene, and derivatives thereof.

In addition, the compound is preferably an alkali-soluble compound having an acid group so that the selective permeation of water is improved and the salt blockage rate is increased when the separation membrane is used for the separation of, for example, an aqueous solution.

Examples of preferable acid structures include carboxylic acid, phosphonic acid, phosphoric acid, and sulfonic acid, and the acid structure may be present in any form of an acid, an ester compound, and a metal salt. The compound having one or more ethylenic unsaturated groups can contain two or more acids, and particularly a compound having one or two acid groups is preferred.

Of the compounds having one or more ethylenic unsaturated groups, examples of compounds having a carboxylic acid group include the following compounds: maleic acid, maleic anhydride, acrylic acid, methacrylic acid, 2-(hydroxymethyl)acrylic acid, 4-(meth)acryl-oyloxyethyltrimellitic acid and the corresponding anhydrides, 10-methacryloyloxydecyl malonic acid, N-(2-hydroxy-3-methacryloyloxypropyl)-N-phenyl glycine, and 4-vinylbenzoic acid.

Of the compounds having one or more ethylenic unsaturated groups, examples of compounds having a phosphonic acid group include vinylphosphonic acid, 4-vinylphenylphosphonic acid, 4-vinylbenzylphosphonic acid, 2-methacryloyloxyethyl phosphonic acid, 2-methacrylamideethylphosphonic acid, 4-methacrylamide-4-methyl-phenylphosphonic acid, 2-[4-(dihydroxyphosphoryl)-2-oxa-butyl]-acrylic acid, and 2-[2-dihydroxyphoshoryl)-ethoxymethyl]-acrylic acid-2,4,6-trimethyl-phenyl ester.

Of the compounds having one or more ethylenic unsaturated groups, examples of phosphate ester compounds include 2-methacryloyloxypropyl monohydrogenphosphate, 2-meth-acryloyloxypropyl dihydrogenphosphate, 2-methacryloyloxyethyl monohydrogenphosphate, 2-methacryloyloxyethyl dihydrogenphosphate, 2-methacryloyloxyethylphenyl hydrogenphosphate, dipentaerythritol-pentamethacryloyl oxyphosphate, 10-methacryloyloxydecyl dihydro-genphosphate, dipentaerythritol pentamethacryloyl oxyphosphate, phosphoric acid mono-(1-acryloyl-piperidin-4-yl)-ester, 6-(methacrylamide)hexyl dihydrogenphosphate, and 1,3-bis-(N-acryloyl-N-propyl-amino)-propane-2-yl dihydrogenphosphate.

Of the compounds having one or more ethylenic unsaturated groups, examples of compounds having a sulfonic acid group include vinylsulfonic acid, 4-vinylphenylsulfonic acid, and 3-(methacrylamide)propylsulfonic acid.

In forming the separation functional layer with an organic-inorganic hybrid structure, a reaction liquid containing the compound (A), the compound (B) and a polymerization initiator is used. The molecular weights of these compounds can be increased by applying this reaction liquid onto the porous support layer, condensing the hydrolyzable group, and polymerizing the ethylenic unsaturated group.

When the compound (A) is solely condensed, bond of a crosslinking chain is concentrated around the silicon atom, and therefore the difference in the density between the area near the silicon atom and the area remote from the silicon atom is increased. Consequently, the pore size in the separation functional layer tends to be nonuniform. On the other hand, an increase in molecular weight and crosslinking of the compound (A) itself combined with the copolymerization of the compound (B) with the compound (A) result in the adequate dispersion of the cross-linking points by the condensation of the hydrolyzable group and the crosslinking points by the polymerization of the ethylenic unsaturated group. Since the crosslinking points are thus dispersed, the pore size in the separation membrane becomes uniform. Consequently, a good balance between the water permeability and the removal performance in the separation membrane is realized. Further, although a low molecular weight compound having one or more ethylenic unsaturated groups may be eluted during the use of the separation membrane to deteriorate the membrane performance, the deterioration of the membrane performance can be suppressed since the molecular weight of the compound is increased in the separation functional layer.

In such a production method, the content of the compound (A) is preferably 10 parts by weight or more, and more preferably 20 to 50 parts by weight with respect to 100 parts by weight of the solid content contained in the reaction liquid. The solid content contained in the reaction liquid refers to all the components contained in the reaction liquid excluding the solvent, the water produced by the condensation reaction, the components to be distilled off such as alcohols, namely, the components which will be finally included, as the separation functional layer, in a composite semipermeable membrane to be obtained. When the amount of the compound (A) is enough, an adequate degree of crosslinking is achieved, resulting in a reduction in the possibility of the occurrence of troubles that components in the separation functional layer are eluted during filtration by a membrane to deteriorate separation performance.

The content of the compound (B) is preferably 90 parts by weight or less, and more preferably 50 to 80 parts by weight with respect to 100 parts by weight of the solid content contained in the reaction liquid. When the content of the compound (B) is within this range, since the resulting separation functional layer has a higher degree of crosslinking, filtration by a membrane can be conducted stably without elution of the separation functional layer.

Next, a method used to form the separation functional layer having the above-mentioned organic-inorganic hybrid structure on the porous support layer will be described.

An exemplary method of forming the separation functional layer includes the step of applying the reaction liquid containing the compound (A) and the compound (B), the step of removing the solvent, the step of polymerizing the ethylenic unsaturated group, and the step of condensing the hydrolyzable group, conducted in this order. The step of polymerizing the ethylenic unsaturated group may include condensing the hydrolyzable group simultaneously.

First, the reaction liquid containing the compound (A) and the compound (B) is brought in contact with a porous support layer described later. The reaction liquid is usually a solution containing a solvent, and the solvent is not particularly limited as long as it does not destroy the porous support layer and it dissolves the compound (A), the compound (B), and a polymerization initiator to be added as required. The hydrolysis of the compound (A) can be promoted by adding water in a molar amount of 1 to 10 times, and preferably in a molar amount of 1 to 5 times larger than the molar amount of the compound (A) together with an inorganic acid or an organic acid to the reaction liquid.

Preferable examples of solvents for the reaction liquid include water, alcohol-based organic solvents, ether-based organic solvents, ketone-based organic solvents, and mixtures thereof. Examples of the alcohol-based organic solvents include methanol, ethoxymethanol, ethanol, propanol, butanol, amyl alcohol, cyclohexanol, methylcyclohexanol, ethylene glycol monomethyl ether (2-methoxyethanol), ethylene glycol monoacetate ester, diethylene glycol monomethyl ether, diethylene glycol monoacetate, propylene glycol monoethyl ether, propylene glycol monoacetate, dipropylene glycol monoethyl ether, and methoxybutanol. Examples of the ether-based organic solvents include methylal, diethyl ether, dipropyl ether, dibutyl ether, diamyl ether, diethyl acetal, dihexyl ether, trioxane, and dioxane. Examples of the ketone-based organic solvents include acetone, methyl ethyl ketone, methyl propyl ketone, methyl isobutyl ketone, methyl amyl ketone, methyl cyclohexyl ketone, diethyl ketone, ethyl butyl ketone, trimethyl nonanone, acetonitrile acetone, dimethyl oxide, phorone, cyclohexanone, and diacetone alcohol.

Further, the amount of the solvent added is preferably 50 parts by weight or more and more preferably 80 parts by weight or more with respect to 100 parts by weight of the solid content contained in the reaction liquid. When the amount of the solvent added is 50 parts by weight or more with respect to 100 parts by weight of the solid content, a membrane having good water permeability is obtained. Further, when the amount of the solvent added is or less with respect to 100 parts by weight of the solid content, there is an advantage that defects are hardly formed in the membrane.

The porous support layer is preferably brought into contact with the reaction liquid evenly and continuously on the porous support layer. Specific examples of methods of bringing the porous support layer into contact with the reaction liquid include a method of coating the porous support layer with the reaction liquid using a coating device such as a spin coater, a wire bar, a flow coater, a die coater, a roll coater, or a spray. Alternatively, the porous support layer may be dipped in the reaction liquid.

When the porous support layer is dipped in the reaction liquid, the time of contact between the porous support layer and the reaction liquid is preferably 0.5 to 10 minutes, and more preferably 1 to 3 minutes. After the contact of the reaction liquid with the porous support layer, preferably, the reaction liquid is adequately removed from the porous support layer so that no drops of reaction liquid remain on the porous support layer. Sufficient removal of the reaction liquid can prevent membrane defects formed from the remaining drops of the reaction liquid after formation of the membrane, resulting in the deterioration of the membrane performance. As a method of removing the reaction liquid, a method of vertically holding the porous support layer having been brought into contact with the reaction liquid to facilitate natural draining of the excessive reaction liquid, or a method of compulsorily blowing the drops off the membrane by blowing nitrogen or other gas stream from an air nozzle (i.e., an air knife) can be used. Further, the membrane surface may be dried after the removal of the reaction liquid to partly remove the solvent of the reaction liquid.

The step of condensing the hydrolyzable group of silicon is conducted by bringing the reaction liquid into contact with the porous support layer, followed by heating. The temperature in this heating requires to be below the temperature at which the porous support layer melts to be deteriorated in performance as the separation membrane. To make the condensation reaction smoothly proceed, it is preferred to conduct heating usually at 0° C. or higher, and more preferably at 20° C. or higher. The reaction temperature is preferably 150° C. or lower, and more preferably 100° C. or lower. When the reaction temperature is 0° C. or higher, the hydrolysis and the condensation reaction smoothly proceed, and when the temperature is 150° C. or lower, the hydrolysis and the condensation reaction can be readily controlled. Further, it is possible to make the reaction proceed even at a lower temperature by adding a catalyst which promotes the hydrolysis or the condensation. The condensation reaction can be appropriately conducted by selecting heating conditions and humidity conditions so that the resulting separation functional layer has fine pores.

Heat treatment and irradiation with an electromagnetic wave, electron beams or plasma may be employed for a polymerization method of the ethylenic unsaturated group of the compounds having an ethylenic unsaturated group of the compound (A) and the compound (B). Electromagnetic waves include an infrared ray, an ultraviolet ray, an X ray and a γ ray. Any method appropriately selected may be used for the polymerization, and the polymerization by irradiation with an electromagnetic wave is preferred in view of the running cost, productivity and the like. Among the electromagnetic waves, the infrared radiation or ultraviolet radiation is more preferred in view of the convenience. When the polymerization is actually conducted by using the infrared radiation or the ultraviolet radiation, the light source thereof does not have to selectively emit the light of this wavelength region, and the light may be one including the electromagnetic wave in these wavelength regions. However, the intensity of electromagnetic waves in these wavelength regions is preferably stronger than the intensity of the electromagnetic waves in other wavelength regions in view of reducing the time required for the polymerization and ease of control of the polymerization conditions.

The electromagnetic wave can be emitted from a halogen lamp, a xenon lamp, a UV lamp, an excimer lamp, a metal halide lamp, a rare gas fluorescent lamp, a mercury lamp, or the like. The energy of the electromagnetic wave is not particularly limited as long as it can accomplish the polymerization, and particularly an ultraviolet ray having high efficiency and a low wavelength has a high ability to form a thin membrane. Such an ultraviolet ray can be emitted from a low pressure mercury lamp or an excimer laser lamp. The thickness and form of the resulting separation functional layer may vary significantly according to the polymerization conditions, and in the case of the polymerization using an electromagnetic wave, the thickness and form may vary significantly according to the wavelength, intensity, distance to the irradiated object and treatment time of the electromagnetic wave. Accordingly, these conditions need to be adequately optimized in each case.

In forming the separation functional layer, a polymerization initiator, a polymerization promoter or the like is preferably added for the purpose of increasing the polymerization rate. The polymerization initiator and the polymerization promoter used herein are not particularly limited, and are adequately selected according to the structure of the compound and the polymerization method to be used.

Polymerization initiators are exemplified below. Examples of polymerization initiators for the polymerization by an electromagnetic wave include benzoin ether, dialkyl benzyl ketal, dialkoxy acetophenone, acylphosphine oxide or bisacylphosphine oxide, α-diketone (for example, 9,10-phenanthrenequinone), diacetylquinone, furilquinone, anisylquinone, 4,4'-dichlorobenzylquinone, and 4,4'-dialkoxybenzylquinone, and camphorquinone. Examples of polymerization initiators for the polymerization by heat include azo compounds (for example, 2,2'-azobis(isobutyronitrile) (AIBN) and azobis-(4-cyanovaleric acid)), peroxides (for example, dibenzoyl peroxide, dilauroyl peroxide, tert-butyl peroctanoate, tert-butyl perbenzoic acid, and di-(tert-butyl)peroxide) and, also, an aromatic diazonium salt, a bis-sulfonium salt, an aromatic iodonium salt, an aromatic sulfonium salt, potassium persulfate, ammonium persulfate, alkyl lithium, cumyl potassium, sodium naphthalene, and distyryl dianion. Among these, benzopinacol and 2,2'-dialkylbenzopinacol are particularly preferred as an initiator for radical polymerization.

The peroxide and the α-diketone are preferably used in combination with an aromatic amine to accelerate the reaction initiation. This combination is also referred to as a redox system. Examples of such a system include combinations of benzoyl peroxide or camphorquinone and an amine (for example, N,N-dimethyl-p-toluidine, N,N-dihydroxyethyl-p-toluidine, or ethyl p-(dimethylamino)benzoate or a derivative thereof). A system containing a peroxide and ascorbic acid, barbiturate or sulfinic acid as a reducing agent in combination is also preferred.

In the subsequent heat treatment at about 100° C. to about 200° C., a polycondensation reaction takes place, and a separation functional layer derived from a silane coupling agent is formed on the surface of the porous support layer. When the heating temperature is too high, depending on the material of the porous support layer, the fine pores of the porous support layer are blocked by melting of the layer, and therefore the amount of water produced of the separation membrane ultimately obtained is reduced. On the other hand, when the temperature is too low, the polycondensation reaction is insufficient, and this results in a reduction in the removal rate due to the elution of the separation functional layer.

In addition, in the production method as described above, the step of increasing the molecular weight of the silane coupling agent and the compound having one or more ethylenic unsaturated groups may be conducted before or after the polycondensation step of the silane coupling agent. Also, the step may be conducted simultaneously with the polycondensation step of the silane coupling agent.

The separation membrane thus obtained having an organic-inorganic hybrid structure can be used as it is. However, the separation membrane is preferably used after hydrophilizing the surface of the membrane with an alcohol-containing aqueous solution, an alkaline aqueous solution, or the like.

Posttreatment

In either separation membrane of the paragraph i) and the paragraph ii) described above, the separation functional layer may be subjected to a chemical treatment by a chlorine-containing compound, an acid, an alkali, nitrous acid, a coupling agent or the like to improve fundamental performance such as permeation performance and removal performance. Moreover, the separation functional layer may be washed for the removal of an unpolymerized monomer.

Formation of Projections and Depressions

A method of providing the height difference is not particularly limited, and methods such as embossing, isostatic pressing, and calendering may be used for the separation membrane. The retention of the morphology of the projections and depressions can be improved by subjecting the separation membrane to a heat treatment at a temperature of 40° C. to 150° C. after forming the height difference on the separation membrane. With respect to the temperature of the heat treatment after the formation, the temperature of heat treatment of polyester fibers can be identified by use of a publicly known method by peeling only a substrate from the separation membrane, and measuring DSC of the substrate.

The step of forming the height difference is not particularly limited. In the stage up to preparation of the separation membrane, the step of processing a porous support layer, the step of processing a substrate, the step of processing a laminate obtained by laminating the porous support layer and the substrate, and the step of processing a separation membrane in which a separation functional layer is formed can be preferably used.

5-2. Arrangement of Channel Material on Feed Side

The channel material on the feed side is disposed on the separation membrane by fusion-bonding. Specific examples of the fusion-bonding include thermal fusion. As a method of thermal fusion, hot-air welding, hot-plate welding, laser welding, high-frequency welding, induction welding, spin welding, vibration welding, ultrasonic welding, and DSI (die slide injection) molding can be employed.

When the channel material on the feed side is arranged by applying a melted resin, a method of applying the resin is not particularly limited as long as the channel material 4 can be arranged in a desired pattern in a band-shaped region on the feed-side surface 31, and examples of equipment used to arrange the channel material include hot-melt applicators of a nozzle type, hot-melt applicators of a spray type, hot-melt applicators of a flat nozzle type, roll coaters, gravure printing method, extrusion type coaters, printing machines, sprayers and the like.

The step of arranging the channel material on the feed side may be performed at any timing in the separation membrane production. For example, the resin can be applied in the step of processing a support membrane at the stage before preparing the separation membrane, the step of processing a laminate of the support membrane and the substrate, or the step of processing the separation membrane.

5-3. Arrangement of Channel Material on Permeate Side

A method of forming the channel material on the permeate side is not particularly limited, but in the case of a continuous shape, the channel material previously processed is preferably laminated on the permeate fluid side of the separation membrane. In the case of a discontinuous morphology, a method in which a material constituting the channel material on the permeate side is directly arranged on the permeate fluid side of the separation membrane by printing, spraying, application with an applicator or hot-melt processing is employed.

5-4. Assembling of Element

An 8-inch element can be prepared in which, for example, the number of leaves is 26 and the effective area is 37 m$^2$, by using a conventional element manufacturing apparatus. As a method of preparing the element, the methods described in reference literatures (JP 44-014216 B, JP 04-011928 B, and JP 11-226366 A) can be used.

The separation membranes are overlaid and bonded to each other while being wound around the water collection tube. The adhesive used for adhesion between the separation membranes preferably has a viscosity of 40 PS (Poise) or more and 150 PS or less, and more preferably 50 PS or more and 120 PS or less. When the viscosity of the adhesive is too high, wrinkles easily occur when a laminated leaf is wound around the water collection tube and the performance of the separation membrane element tends to be deteriorated. On the other hand, when the viscosity of the adhesive is too low, the adhesive flows out of the end (adhered surface portion) of the leaf to contaminate the apparatus and to adhere to an unrelated portion and impair performance of the separation membrane element, and work efficiency is significantly deteriorated due to disposal of the adhesive flown out.

The amount of the adhesive to be applied may be adjusted such that the width of the area to which the adhesive adheres on the separation membrane is 10 mm or more and 100 mm or less after winding the leaf around the water collection tube. Since the application width of the adhesive is 10 mm or more, the occurrence of defective adhesion is suppressed. Therefore, flow of a part of the feed fluid into the permeate side is suppressed. On the other hand, the adhesive may reduce the area of the separation membrane (that is, the effective membrane area) involved in separation by spreading of the adhesive during winding the separation membrane. On the other hand, since the width of the region where the adhesive adheres is 100 mm or less, the effective membrane area can be secured.

As the adhesive, a urethane-based adhesive is preferred, and an adhesive prepared by mixing isocyanate as the main component and a polyol as a curing agent at a ratio of the isocyanate to the polyol of 1:1 to 1:5 is preferred to adjust the viscosity to 40 PS or more and 150 PS or less. The viscosity of the adhesive is a value obtained by measuring the viscosity of a mixture in which the main component, the curing agent alone and the mixing ratio are previously defined by using Type B viscometer (JIS K 6833).

6. Use of Element

The separation membrane element is used as a separation membrane module through further connecting two or more separation membrane elements in series or parallel and accommodating in a pressure vessel.

Further, the separation membrane element and module can be used to constitute a fluid separation apparatus by combining with a pump for the fluid supply, or an apparatus which conducts pretreatment of the fluid. By using the separation apparatus, for example, the raw fluid can be separated into the permeate fluid such as drinking water and the concentrate fluid which has not permeated the membrane to obtain the desired water.

The operation pressure used in the permeation of water to be treated through the membrane module is preferably 0.2 MPa or more and 8.0 MPa or less considering that though the removal rate of the components is improved with the increase of the operation pressure of the fluid separation apparatus, the energy required for the operation also increases with the pressure, and considering the retention of the feed channel and permeate channel of the separation membrane element. The temperature of the raw fluid is preferably 3° C. or higher and 60° C. or lower since an excessively high temperature results in the reduced salt rejection and a lower temperature causes the flux of membrane permeation to decrease.

The fluid treated by the spiral separation membrane element is not particularly limited, and examples of the raw water to be used for water treatment include a liquid mixture containing 500 mg/L to 100 g/L of TDS (total dissolved solids) such as sea water, brackish water, and drainage water. TDS generally refers to the total content of the dissolved solid content and is represented by the unit of "mass/volume" or "weight ratio." By definition, TDS can be calculated from the weight of the residue when a solution filtered through a 0.45 μm filter is evaporated at a temperature of 39.5° C. to 40.5° C., and TDS is more simply converted from a practical salt content (S).

EXAMPLES

Our elements and methods are by no means limited by the following Examples.

Preparation of Separation Membrane

On various substrates shown in Tables 1 and 2, a 16.0% by weight dimethylformamide (DMF) solution of polysulfone was cast at a thickness of 180 μm at room temperature (25° C.). Immediately after the casting, the substrate was immersed in pure water and left for 5 minutes. Thereby, a roll of porous support layer (thickness 135 μm) including a fiber-reinforced polysulfone support membrane was prepared.

The porous support layer roll was wound back (wound off), and an aqueous solution of 1.5% by weight m-PDA and 5.0% by weight ε-caprolactam was applied onto the surface of the polysulfone support membrane. After blowing nitrogen on the surface from an air nozzle to remove an excessive aqueous solution from the support membrane surface, a n-hexane solution at 25° C. containing 0.06% by weight trimesic acid chloride was applied to fully wet the surface of the support membrane. Thereafter, an excessive solution was removed from the membrane by blowing air, and the membrane was washed with hot water at 50° C., immersed into a 2% glycerin aqueous solution for 1 minute, and then treated in a hot-air oven at 100° C. for 3 minutes to obtain a semidry separation membrane roll.

In this way, a separation membrane having a substrate, a support membrane made of polysulfone, and a separation functional layer made of polyamide laminated in this order was obtained.

Height of Channel Material on Feed Side

A sample having a size of 1 cm×5 cm was cut out from the separation membrane to include a portion of the separation membrane where the channel material on the feed side is provided. The height difference of the feed-side surface of the separation membrane was measured by using high precision shape measurement system KS-1100 manufactured by KEYENCE CORPORATION, and an average height difference was analyzed from the result of measurement. Specifically, the height of the channel material was determined by measuring 30 points with at least 10 μm of height difference per sample, summing the height differences measured, and dividing the sum by the number of points measured. This procedure was performed for three samples, and an average value of values obtained as the height of the channel material in these samples was obtained.

Height Difference of Separation Membrane

A sample having a size of 5 cm×5 cm was cut out from a portion of the separation membrane where the channel material on the feed side is not provided, and the height difference of the feed-side surface was measured by using high precision shape measurement system KS-1100 manufactured by KEYENCE CORPORATION, and an average height difference was analyzed from the result of measurement. Specifically, the height difference of the separation membrane was determined by measuring 30 points with at least 10 μm of height difference per sample, summing the height differences measured, and dividing the sum by the number of points measured. This procedure was performed for three samples, and an average value of values obtained as the height difference of the separation membrane in these samples was obtained.

Salt Rejection (Removal Rate of TDS)

Operation (recovery rate 15%) of the element was conducted under the conditions of an operation pressure of 0.75 MPa, an operation temperature of 25° C. and a pH of 7 using a raw fluid having a saline concentration of 500 mg/L. The removal rate of TDS was calculated from the following formula by measuring the saline concentration in the permeate fluid at this time:

Removal rate of TDS (%)=100×{1−(TDS concentration of the permeate fluid/TDS concentration of the raw fluid)}.

Amount of Water Produced

Operation of the element was conducted under the same conditions as in measurement of the salt rejection. The amount of permeate water (cubic meter) permeated per day in a separation membrane element was determined, and taken as the amount of water produced ($m^3$/day).

Example 1

A nonwoven fabric (fiber diameter: 1 decitex, thickness: 90 μm, air permeability: 0.9 cc/$cm^2$/sec) prepared from polyethylene terephthalate fibers by a papermaking method was used as a substrate, and a separation membrane was obtained as described above.

Next, an ethylene-vinyl acetate copolymer resin (701A) was thermally fused to both ends of the surface (on the raw fluid side) of the separation membrane of the separation membrane roll in the form of stripes of an interval of 5.0 mm, a line width of 1.0 mm, a height of 400 μm, an oblique angle 0 of 45° and an application width of 50 mm by using a nozzle type hot-melt processing machine to dispose a channel material on the feed side. In addition, the application width corresponds to the width of the first region in the direction of an x-axis.

Thereafter, tricot (thickness: 300 μm, width of groove: 200 μm, width of ridge: 300 μm, depth of groove: 105 μm) was continuously laminated on the permeate-side surface of the separation membrane as the channel material on the permeate side.

The separation membrane having the channel material on the permeate side laminated thereon was cut and folded, and then a urethane-based adhesive (isocyanate:polyol=1:3) was applied onto the separation membrane so that only one side is opened, and the folded faces were overlaid on each other to prepare 26 envelope-like separation membranes with a width of 930 mm so that the effective area in the separation membrane element was 37.0 $m^2$.

Thereafter, laminates of the envelope-like separation membranes were spirally wound around a holed water collection tube to obtain a wound body composed of 26 envelope-like separation membranes. Subsequently, a film was wound on the outer circumference of the resulting wound body and secured by a tape, and then after cutting the edges, the end plates were fitted on the edges and filament winding was conducted. Thus, an 8-inch spiral separation membrane element was prepared. In addition, the resin bodies provided as the channel material on the feed side on the separation membrane were arranged to cross the resin bodies provided on the opposite separation membrane.

The resulting element was placed in a pressure vessel, and operated under the conditions described above, and consequently, the salt rejection was 99.35%, and the amount of the water produced was 45.4 m³/day. The conditions of the operation and evaluation results of the element are shown together with other Examples in Table 3.

Examples 2 to 4

In Example 2, an element was prepared and evaluated by the same method as in Example 1 except for disposing the channel material on the feed side at only a feed side end (an upstream end) of the raw fluid. Consequently, the salt rejection was 99.25% and the amount of the water produced was 44.1 m³/day.

In Example 3, an element was prepared and evaluated by the same method as in Example 1 except for changing the oblique angle θ of the stripe of the channel material on the feed side to 20°. Consequently, the salt rejection was 99.32% and the amount of the water produced was 45.7 m³/day.

In Example 4, an element was prepared and evaluated by the same method as in Example 1 except for changing the interval to 20.0 mm, the line width to 1.5 mm, the height to 200 μm, the oblique angle θ to 30° and the application width to 80 mm in the stripe shape of the channel material on the feed side. Consequently, the salt rejection was 99.28% and the amount of the water produced was 44.3 m³/day.

Example 5

In Example 5, an element was prepared by the same method as in Example 1 except for changing the arrangement pattern of the channel material on the feed side to grid-like dots (interval: 7.0 mm, diameter: 1.0 mmφ, height: 400 μm, application width: 50 mm). Consequently, the salt rejection was 99.30% and the amount of the water produced was 42.5 m³/day.

Example 6

In Example 6, an element was prepared by the same method as in Example 1 except for changing the substrate to a polyester long fiber nonwoven fabric (fiber diameter: 1 decitex, thickness: about 90 μm, air permeability: 1.0 cc/cm²/sec, fiber orientation degree of a surface layer on the porous support layer side: 40°, fiber orientation degree of a surface layer on the side opposite to the porous support layer:)20°. Consequently, the salt rejection was 99.45% and the amount of the water produced was 45.5 m³/day, and an improvement in the salt rejection by virtue of a reduction of membrane defects at the time of membrane formation was observed.

Example 7

In Example 7, an element was prepared by the same method as in Example 2 except for changing the substrate to a polyester long fiber nonwoven fabric (fiber diameter: 1 decitex, thickness: about 90 μm, air permeability: 1.0 cc/cm²/sec, fiber orientation degree of a surface layer on the porous support layer side: 40°, fiber orientation degree of a surface layer on the side opposite to the porous support layer:)20°. Consequently, the salt rejection was 99.33% and the amount of the water produced was 44.1 m³/day, and an improvement in the salt rejection by virtue of a reduction of membrane defects at the time of membrane formation was observed.

Example 8

In Example 8, an element was prepared by the same method as in Example 3 except for changing the substrate to a polyester long fiber nonwoven fabric (fiber diameter: 1 decitex, thickness: about 90 μm, air permeability: 1.0 cc/cm²/sec, fiber orientation degree of a surface layer on the porous support layer side: 40°, fiber orientation degree of a surface layer on the side opposite to the porous support layer:)20°. Consequently, the salt rejection was 99.37% and the amount of the water produced was 45.9 m³/day, and an improvement in the salt rejection by virtue of a reduction of membrane defects at the time of membrane formation was observed.

Example 9

In Example 9, an element was prepared by the same method as in Example 4 except for changing the substrate to a polyester long fiber nonwoven fabric (fiber diameter: 1 decitex, thickness: about 90 μm, air permeability: 1.0 cc/cm²/sec, fiber orientation degree of a surface layer on the porous support layer side: 40°, fiber orientation degree of a surface layer on the side opposite to the porous support layer: 20°). Consequently, the salt rejection was 99.35% and the amount of the water produced was 44.4 m³/day, and an improvement in the salt rejection by virtue of a reduction of membrane defects at the time of membrane formation was observed.

Example 10

In Example 10, an element was prepared by the same method as in Example 6 except for changing the interval to 30.0 mm in the stripe shape of the channel material on the feed side. Consequently, the salt rejection was 99.41% and the amount of the water produced was 44.3 m³/day.

Example 11

In Example 11, an element was prepared by the same method as in Example 6 except for changing the substrate to a substrate having a fiber orientation degree of 20° at a surface layer on the porous support layer side and a fiber orientation degree of 40° at a surface layer on the side opposite to the porous support layer. Consequently, the salt rejection was 98.30% and the amount of the water produced was 43.5 m³/day, and the salt rejection and the amount of water produced were reduced due to an increase of membrane defects at the time of membrane formation.

Example 12

An element was prepared and evaluated by the same method as in Example 1 except for changing the oblique angle θ in the stripe processing to 70°. Consequently, the salt rejection was 99.30% and the amount of the water produced was 42.2 m³/day, and the amount of water produced was slightly reduced due to an increase of resistance at the time when the raw fluid flows into the element feed-side surface.

Example 13

An element was prepared and evaluated by the same method as in Example 1 except for changing the oblique angle θ in the stripe processing to 85°. Consequently, the salt rejection was 99.05% and the amount of the water produced was 35.2 m³/day, and the amount of water produced was reduced due to an increase of resistance at the time when the raw fluid flows into the element feed-side surface.

Example 14

In Example 14, an element was prepared by the same method as in Example 1 except for performing embossing of a net shape for the separation membrane prior to thermal fusion of a resin to an end of the separation membrane to provide a height difference of 200 μm for the surface (on the feed fluid side) of the separation membrane. Consequently, the salt rejection was 99.51% and the amount of the water produced was 45.7 m³/day, and the salt rejection was further improved since concentration polarization based on a turbulence effect was suppressed.

Example 15

An element was prepared in the same manner as in Example 1 except for changing the channel material on the permeate side from tricot to a member which was formed by hot-melting and arranged in the form of stripes parallel to a winding direction. That is, an ethylene-vinyl acetate copolymer resin (trade name: 703A) was linearly applied under the conditions of a resin temperature of 125° C. and a running speed of 3 m/min so that the applied resin was perpendicular to the axial direction of the water collection tube from the inner end to the outer end in a winding direction of the separation membrane by use of a hotmelt applicator equipped with a comb-shaped shim having a slit width of 450 μm and a line width of 450 μm. The channel material on the permeate side thus obtained has a height of 140 μm, the cross-section shape of a trapezoid with an upper base of 0.4 mm long and a lower base of 0.6 mm long, a groove width of 0.4 mm and an interval of 1.0 mm, and was a wall-like member arranged in the form of stripes.

The element of the present example was operated, and consequently, the salt rejection was 99.35% and the amount of the water produced was 52.5 m³/day.

Example 16

In Example 16, an element was prepared by the same method as in Example 15 except for changing the substrate to a polyester long fiber nonwoven fabric (fiber diameter: 1 decitex, thickness: about 90 um, air permeability: 1.0 cc/cm²/sec, fiber orientation degree of a surface layer on the porous support layer side: 40°, fiber orientation degree of a surface layer on the side opposite to the porous support layer:)20°. Consequently, the salt rejection was 99.48% and the amount of the water produced was 52.6 m³/day, and an improvement in the salt rejection by virtue of a reduction of membrane defects at the time of membrane formation was observed.

Example 17

In Example 17, the application width of the channel material on the feed side was set to 30 mm. Further, two envelope-like membranes with a width of 280 mm were prepared so that the effective area in the separation membrane element was 0.5 m². Other members and procedure are similar to those in Example 1. A 2-inch element was prepared by the same method as in Example 1 by using the envelope-like separation membrane. Consequently, the salt rejection was 99.30% and the amount of the water produced was 0.61 m³/day.

Example 18

In Example 18, an element was prepared by the same method as in Example 17 except for changing the substrate to a polyester long fiber nonwoven fabric (fiber diameter: 1 decitex, thickness: about 90 um, air permeability: 1.0 cc/cm²/sec, fiber orientation degree of a surface layer on the porous support layer side: 40°, fiber orientation degree of a surface layer on the side opposite to the porous support layer:)20°. Consequently, the salt rejection was 99.45% and the amount of the water produced was 0.61 m³/day, and an improvement in the salt rejection by virtue of a reduction of membrane defects at the time of membrane formation was observed.

Example 19

In Example 19, an element was prepared by the same method as in Example 17 except for changing the channel material on the permeate side from the tricot to a wall-like body (height: 140 μm, the cross-section shape is a trapezoid with an upper base of 0.4 mm long and a lower base of 0.6 mm long, groove width: 0.4 mm, interval: 1.0 mm) made of an ethylene-vinyl acetate copolymer resin (trade name: 701A). Consequently, the salt rejection was 99.35% and the amount of the water produced was 0.73 m³/day. The wall-like body was applied by following the same technique as in Example 15.

Example 20

In Example 20, an element was prepared by the same method as in Example 19 except for changing the substrate to a polyester long fiber nonwoven fabric (fiber diameter: 1 decitex, thickness: about 90 μm, air permeability: 1.0 cc/cm²/sec, fiber orientation degree of a surface layer on the porous support layer side: 40°, fiber orientation degree of a surface layer on the side opposite to the porous support layer:)20°. Consequently, the salt rejection was 99.44% and the amount of the water produced was 0.73 m³/day, and an improvement in the salt rejection by virtue of a reduction of membrane defects at the time of membrane formation was observed.

Example 21

In Example 21, six envelope-like membranes with a width of 280 mm were prepared so that the effective area in the separation membrane element was 1.5 m². A 3-inch element was prepared by the same method as in Example 1 by using the envelope-like membrane. Consequently, the salt rejection was 99.30% and the amount of the water produced was 1.84 m³/day.

Comparative Example 1

An 8-inch element was prepared by the same method as in Example 1 except for arranging a net (thickness: 900 µm, pitch: 3 mm×3 mm) on the entire surface of the separation membrane in place of thermally fusing a resin to the end as the channel material on the feed side. Consequently, the salt rejection was 99.30% and the amount of the water produced was 41.2 m³/day.

Comparative Example 2

An 8-inch element was prepared by the same method as in Example 1 except for arranging a net (thickness: 900 um, pitch: 3 mm×3 mm, width: 50 mm) on both ends in place of thermally fusing a resin to both ends as the channel material on the feed side. Consequently, the salt rejection was 98.90% and the amount of the water produced was 41.4 m³/day, and an improvement in the amount of water produced was slight, and a reduction of the salt rejection was observed.

Comparative Example 3

A 2-inch element was prepared by the same method as in Example 16 except for arranging a net (thickness: 900 µm, pitch: 3 mm×3 mm) on the entire surface of the separation membrane in place of thermally fusing a resin to the end as the channel material on the feed side. Consequently, the salt rejection was 99.30% and the amount of the water produced was 0.55 m³/day.

Comparative Example 4

A 2-inch element was prepared by the same method as in Example 16 except for arranging a net (thickness: 900 µm, pitch: 3 mm×3 mm, width: 50 mm) on both ends in place of thermally fusing a resin to both ends as the channel material on the feed side. Consequently, the salt rejection was 98.88% and the amount of the water produced was 0.56 m³/day, and an improvement in the amount of water produced was slight, and a reduction of the salt rejection was observed.

Comparative Example 5

A 3-inch element was prepared by the same method as in Example 20 except for arranging a net (thickness: 900 µm, pitch: 3 mm×3 mm) on the entire surface of the separation membrane in place of thermally fusing a resin to the end as the channel material on the feed side. Consequently, the salt rejection was 99.31% and the amount of the water produced was 1.66 m³/day.

Comparative Example 6

A 3-inch element was prepared by the same method as in Example 20 except for arranging a net (thickness: 900 µm, pitch: 3 mm×3 mm, width: 50 mm) on both ends in place of thermally fusing a resin to both ends as the channel material on the feed side. Consequently, the salt rejection was 98.89% and the amount of the water produced was 1.70 m³/day, and an improvement in the amount of water produced was slight, and a reduction of the salt rejection was observed.

Example 22

An element was prepared and evaluated by the same method as in Example 1 except for disposing the channel material on the feed side at both ends and a central portion (an area of 435 mm to 495 mm from the upstream end of the separation membrane) of the separation membrane and changing the application width by hot-melting to 60 mm. Consequently, the salt rejection was 99.39% and the amount of the water produced was 43.8 m³/day.

Examples 23 to 27

In Example 23, an element was prepared by the same method as in Example 22 except that the resin was applied onto only a feed side end (an upstream end) of the raw fluid and a central portion. The element was operated, and consequently, the salt rejection was 99.35% and the amount of the water produced was 44.2 m³/day.

In Example 24, an element was prepared by the same method as in Example 22 except for changing the oblique angle in the stripe processing to 20°. The element was operated, and consequently, the salt rejection was 99.37% and the amount of the water produced was 44.0 m³/day.

In Example 25, an element was prepared by the same method as in Example 22 except for changing the interval to 20.0 mm, the line width to 1.5 mm, the height to 200 µm, the oblique angle to 30° and the application width to 80 mm in the stripe shape. This element was operated, and consequently, the salt rejection was 99.31% and the amount of the water produced was 43.2 m³/day.

In Example 26, an element was prepared by the same method as in Example 22 except for thermally fusing an ethylene-vinyl acetate copolymer resin (701A) to areas within 60 mm from both ends of the surface (on the raw fluid side) of the separation membrane, an area of 290 mm to 350 mm from the upstream end, and an area of 580 mm to 640 mm from the end. That is, in the separation membrane on which a resin is applied by thermal fusion, four regions (first region) had the same width of 60 mm and three regions (second region) to which a resin is not applied had the same width of 230 mm. That is, regions of a resin body were evenly arranged on the separation membrane. The element thus obtained was operated, and consequently, the salt rejection was 99.47% and the amount of the water produced was 43.4 m³"day.

In Example 27, an element was prepared by the same method as in Example 22 except for changing the application width to 90 mm. This element was operated, and consequently, the salt rejection was 99.48% and the amount of the water produced was 43.5 m³/day.

Example 28

An element was prepared by the same method as in Example 22 except for changing the application pattern of the resin to grid-like dots (interval: 7.0 mm, diameter: 1.0 mmφ, height: 400 µm, application width: 60 mm). Consequently, the salt rejection was 99.40% and the amount of the water produced was 41.9 m³/day.

Example 29

An element was prepared by the same method as in Example 22 except for changing the substrate to a polyester long fiber nonwoven fabric (fiber diameter: 1 decitex, thickness: about 90 µm, air permeability: 1.0 cc/cm²/sec, fiber orientation degree of a surface layer on the porous support layer side: 40°, fiber orientation degree of a surface layer on the side opposite to the porous support layer:)20°. This element was operated, and consequently, the salt rejection was 99.46% and the amount of the water produced was 43.8 m$^3$/day, and an improvement in the salt rejection by virtue of a reduction of membrane defects at the time of membrane formation was observed.

Example 30

An element was prepared by the same method as in Example 22 except for imparting projections and depressions to the separation membrane. That is, embossing of a separation membrane roll was performed at a linear pressure of 40 kg/cm and at 100° C. on a region where the channel material on the feed side is not arranged by using an embossing roll with a net-shaped pattern having an interval of 5 mm and a projected area ratio of 0.30 prior to thermal fusion of a resin to an end of the separation membrane, and thereby, a height difference of 400 gm (i.e., 800 µm when an envelope-like separation membrane is formed) was formed on the surface (on the feed fluid side) of the separation membrane. Consequently, the salt rejection was 99.57% and the amount of the water produced was 44.7 m$^3$/day, and the salt rejection was further improved since concentration polarization based on a turbulence effect was suppressed.

Example 31

An element was prepared in the same manner as in Example 22 except for changing the channel material on the permeate side to the wall-like member described above.

The element was operated, and consequently, the salt rejection was 99.41% and the amount of the water produced was 50.8 m$^3$/day.

Example 32

In Example 32, the application width was set to 30 mm, and two envelope-like membranes with a width of 280 mm were prepared so that the effective area in the separation membrane element was 0.5 m$^2$. A 2-inch element was prepared by the same method as in Example 22 by using the envelope-like membrane. Consequently, the salt rejection was 99.33% and the amount of the water produced was 0.59 m$^3$/day.

Example 33

In Example 33, an element was prepared by the same method as in Example 32 except for changing the substrate to a polyester long fiber nonwoven fabric (fiber diameter: 1 decitex, thickness: about 90 um, air permeability: 1.0 cc/cm$^2$/sec, fiber orientation degree of a surface layer on the porous support layer side: 40°, fiber orientation degree of a surface layer on the side opposite to the porous support layer:)20°. Consequently, the salt rejection was 99.45% and the amount of the water produced was 0.59 m$^3$/day, and an improvement in the salt rejection by virtue of a reduction of membrane defects at the time of membrane formation was observed.

Example 34

In Example 34, an element was prepared by the same method as in Example 32 except for changing the channel material on the permeate side from the tricot to a wall-like body (height: 140 um, the cross-section shape is a trapezoid with an upper base of 0.4 mm long and a lower base of 0.6 mm long, groove width: 0.4 mm, interval: 1.0 mm) made of an ethylene-vinyl acetate copolymer resin (trade name: 701A). Consequently, the salt rejection was 99.35% and the amount of the water produced was 0.71 m$^3$/day. The wall-like body was applied by following the same technique as in Example 15.

Example 35

In Example 35, an element was prepared by the same method as in Example 34 except for changing the substrate to a polyester long fiber nonwoven fabric (fiber diameter: 1 decitex, thickness: about 90 um, air permeability: 1.0 cc/cm$^2$/sec, fiber orientation degree of a surface layer on the porous support layer side: 40°, fiber orientation degree of a surface layer on the side opposite to the porous support layer:)20°. Consequently, the salt rejection was 99.44% and the amount of the water produced was 0.71 m$^3$/day, and an improvement in the salt rejection by virtue of a reduction of membrane defects at the time of membrane formation was observed.

Example 36

In Example 36, a 3-inch spiral separation membrane element was prepared by the same method as in Example 32 except for preparing six envelope-like membranes with a width of 280 mm so that the effective area in the separation membrane element was 1.5 m$^2$. Consequently, the salt rejection was 99.30% and the amount of the water produced was 1.78 m$^3$/day.

Example 37

An element was prepared by the same method as in Example 22 except for changing the oblique angle of the channel material on the feed side to 70°. This element was operated, and consequently, the salt rejection was 99.33% and the amount of the water produced was 40.0 m$^3$/day, and no improvement in performance was found due to an increase of pressure loss.

Example 38

An element was prepared and evaluated by the same method as in Example 22 except for changing the interval to 50.0 mm, the line width to 1.5 mm, the height to 400 µm, the oblique angle to 15° and the application width to 50 mm in the stripe shape. In this Example, the channel material on the feed side did not form a cross structure. Consequently, the salt rejection was 98.79% and the amount of the water produced was 33.5 m$^3$/day.

TABLE 1A

| | Separation membrane | | | Feed side channel material | | | |
|---|---|---|---|---|---|---|---|
| | Substrate | Height difference (μm) | Pattern of height difference | Material | Configuration | Oblique angle (°) | Line width or line diameter (mm) |
| Example 1 | Nonwoven fabric by papermaking method | — | — | EVA | stripe | 45 | 1.0 |
| Example 2 | Nonwoven fabric by papermaking method | — | — | EVA | stripe | 45 | 1.0 |
| Example 3 | Nonwoven fabric by papermaking method | — | — | EVA | stripe | 20 | 1.0 |
| Example 4 | Nonwoven fabric by papermaking method | — | — | EVA | stripe | 30 | 1.5 |
| Example 5 | Nonwoven fabric by papermaking method | — | — | EVA | dot (grid pattern) | — | 1.0 |
| Example 6 | Long fiber nonwoven fabric | — | — | EVA | stripe | 45 | 1.0 |
| Example 7 | Long fiber nonwoven fabric | — | — | EVA | stripe | 45 | 1.0 |
| Example 8 | Long fiber nonwoven fabric | — | — | EVA | stripe | 20 | 1.0 |
| Example 9 | Long fiber nonwoven fabric | — | — | EVA | stripe | 30 | 1.5 |
| Example 10 | Long fiber nonwoven fabric | — | — | EVA | stripe | 45 | 1.0 |
| Example 11 | Long fiber nonwoven fabric | — | — | EVA | stripe | 45 | 1.0 |
| Example 12 | Nonwoven fabric by papermaking method | — | — | EVA | stripe | 70 | 1.0 |
| Example 13 | Nonwoven fabric by papermaking method | — | — | EVA | stripe | 85 | 1.0 |
| Example 14 | Nonwoven fabric by papermaking method | 200 | Net pattern | EVA | stripe | 45 | 1.0 |
| Example 15 | Nonwoven fabric by papermaking method | — | — | EVA | stripe | 45 | 1.0 |
| Example 16 | Long fiber nonwoven fabric | — | — | EVA | stripe | 45 | 1.0 |
| Example 17 | Nonwoven fabric by papermaking method | — | — | EVA | stripe | 45 | 1.0 |
| Example 18 | Long fiber nonwoven fabric | — | — | EVA | stripe | 45 | 1.0 |
| Example 19 | Nonwoven fabric by papermaking method | — | — | EVA | stripe | 45 | 1.0 |
| Example 20 | Long fiber nonwoven fabric | — | — | EVA | stripe | 45 | 1.0 |
| Example 21 | Nonwoven fabric by papermaking method | — | — | EVA | stripe | 45 | 1.0 |

TABLE 1B

| | Feed side channel material | | | | | Permeate side channel material | | Element size (inch) |
|---|---|---|---|---|---|---|---|---|
| | Interval (mm) | Height (mm) | Application width (mm) | Number of regions | Location | Material | Configuration | |
| Example 1 | 5.0 | 0.4 | 50 | 2 | Both ends | PET | tricot | 8 |
| Example 2 | 5.0 | 0.4 | 50 | 1 | One end | PET | tricot | 8 |
| Example 3 | 5.0 | 0.4 | 50 | 2 | Both ends | PET | tricot | 8 |
| Example 4 | 20.0 | 0.2 | 80 | 2 | Both ends | PET | tricot | 8 |
| Example 5 | 7.0 | 0.4 | 50 | 2 | Both ends | PET | tricot | 8 |
| Example 6 | 5.0 | 0.4 | 50 | 2 | Both ends | PET | tricot | 8 |
| Example 7 | 5.0 | 0.4 | 50 | 1 | One end | PET | tricot | 8 |
| Example 8 | 5.0 | 0.4 | 50 | 2 | Both ends | PET | tricot | 8 |
| Example 9 | 20.0 | 0.2 | 80 | 2 | Both ends | PET | tricot | 8 |
| Example 10 | 30.0 | 0.4 | 50 | 2 | Both ends | PET | tricot | 8 |
| Example 11 | 5.0 | 0.4 | 50 | 2 | Both ends | PET | tricot | 8 |
| Example 12 | 5.0 | 0.4 | 50 | 2 | Both ends | PET | tricot | 8 |
| Example 13 | 5.0 | 0.4 | 50 | 2 | Both ends | PET | tricot | 8 |
| Example 14 | 5.0 | 0.4 | 50 | 2 | Both ends | PET | tricot | 8 |
| Example 15 | 5.0 | 0.4 | 50 | 2 | Both ends | EVA | stripe | 8 |
| Example 16 | 5.0 | 0.4 | 50 | 2 | Both ends | EVA | stripe | 8 |
| Example 17 | 5.0 | 0.4 | 30 | 2 | Both ends | PET | tricot | 2 |
| Example 18 | 5.0 | 0.4 | 30 | 2 | Both ends | PET | tricot | 2 |
| Example 19 | 5.0 | 0.4 | 30 | 2 | Both ends | EVA | stripe | 2 |
| Example 20 | 5.0 | 0.4 | 30 | 2 | Both ends | EVA | stripe | 2 |
| Example 21 | 5.0 | 0.4 | 30 | 2 | Both ends | PET | tricot | 3 |

TABLE 2A

| | Separation Membrane | | | Feed side channel material | | | |
|---|---|---|---|---|---|---|---|
| | Substrate | Height difference (μm) | Pattern of height difference | Material | Configuration | Oblique angle (°) | Line width or line diameter (mm) |
| Example 22 | Nonwoven fabric by papermaking method | — | — | EVA | stripe | 45 | 1.0 |
| Example 23 | Nonwoven fabric by papermaking method | — | — | EVA | stripe | 45 | 1.0 |
| Example 24 | Nonwoven fabric by papermaking method | — | — | EVA | stripe | 20 | 1.0 |
| Example 25 | Nonwoven fabric by papermaking method | — | — | EVA | stripe | 30 | 1.5 |
| Example 26 | Nonwoven fabric by papermaking method | — | — | EVA | stripe | 45 | 1.0 |
| Example 27 | Nonwoven fabric by papermaking method | — | — | EVA | stripe | 45 | 1.0 |
| Example 28 | Nonwoven fabric by papermaking method | — | — | EVA | dot (grid pattern) | — | 1.0 |
| Example 29 | Long fiber nonwoven fabric | — | — | EVA | stripe | 45 | 1.0 |
| Example 30 | Nonwoven fabric by papermaking method | 400 | net pattern | EVA | stripe | 45 | 1.0 |
| Example 31 | Nonwoven fabric by papermaking method | — | — | EVA | stripe | 45 | 1.0 |
| Example 32 | Nonwoven fabric by papermaking method | — | — | EVA | stripe | 45 | 1.0 |
| Example 33 | Long fiber nonwoven fabric | — | — | EVA | stripe | 45 | 1.0 |
| Example 34 | Nonwoven fabric by papermaking method | — | — | EVA | stripe | 45 | 1.0 |
| Example 35 | Long fiber nonwoven fabric | — | — | EVA | stripe | 45 | 1.0 |
| Example 36 | Nonwoven fabric by papermaking method | — | — | EVA | stripe | 45 | 1.0 |
| Example 37 | Nonwoven fabric by papermaking method | — | — | EVA | stripe | 70 | 1.0 |
| Example 38 | Nonwoven fabric by papermaking method | — | — | EVA | stripe | 15 | 1.5 |
| Comparative Example 1 | Nonwoven fabric by papermaking method | — | — | poly-ethylene | net | — | — |
| Comparative Example 2 | Nonwoven fabric by papermaking method | — | — | poly-ethylene | net | — | — |
| Comparative Example 3 | Nonwoven fabric by papermaking method | — | — | poly-ethylene | net | — | — |
| Comparative Example 4 | Nonwoven fabric by papermaking method | — | — | poly-ethylene | net | — | — |
| Comparative Example 5 | Nonwoven fabric by papermaking method | — | — | poly-ethylene | net | — | — |
| Comparative Example 6 | Nonwoven fabric by papermaking method | — | — | poly-ethylene | net | — | — |

TABLE 2B

| | Feed side channel material | | | | | Permeate side channel material | | Element size |
|---|---|---|---|---|---|---|---|---|
| | Interval (mm) | Height (mm) | Application width (mm) | Number of regions | Location | Material | Configuration | (inch) |
| Example 22 | 5.0 | 0.4 | 60 | 3 | Both ends and central portion | PET | tricot | 8 |
| Example 23 | 5.0 | 0.4 | 60 | 2 | One end and central portion | PET | tricot | 8 |
| Example 24 | 5.0 | 0.4 | 60 | 3 | Both ends and central portion | PET | tricot | 8 |
| Example 25 | 20.0 | 0.2 | 60 | 3 | Both ends and central portion | PET | tricot | 8 |
| Example 26 | 5.0 | 0.4 | 60 | 4 | Even arrangement including both ends | PET | tricot | 8 |
| Example 27 | 5.0 | 0.4 | 90 | 3 | Both ends and central portion | PET | tricot | 8 |
| Example 28 | 7.0 | 0.4 | 60 | 3 | Both ends and central portion | PET | tricot | 8 |
| Example 29 | 5.0 | 0.4 | 60 | 3 | Both ends and central portion | PET | tricot | 8 |
| Example 30 | 5.0 | 0.4 | 60 | 3 | Both ends and central portion | PET | tricot | 8 |
| Example 31 | 5.0 | 0.4 | 60 | 3 | Both ends and central portion | EVA | stripe | 8 |
| Example 32 | 5.0 | 0.4 | 30 | 3 | Both ends and central portion | PET | tricot | 2 |
| Example 33 | 5.0 | 0.4 | 30 | 3 | Both ends and central portion | PET | tricot | 2 |
| Example 34 | 5.0 | 0.4 | 30 | 3 | Both ends and central portion | EVA | stripe | 2 |
| Example 35 | 5.0 | 0.4 | 30 | 3 | Both ends and central portion | EVA | stripe | 2 |

TABLE 2B-continued

| | Feed side channel material | | | | | Permeate side channel material | | Element size (inch) |
|---|---|---|---|---|---|---|---|---|
| | Application | | | Region where channel material is arranged | | | | |
| | Interval (mm) | Height (mm) | width (mm) | Number of regions | Location | Material | Configuration | |
| Example 36 | 5.0 | 0.4 | 30 | 3 | Both ends and central portion | PET | tricot | 3 |
| Example 37 | 5.0 | 0.4 | 60 | 3 | Both ends and central portion | PET | tricot | 8 |
| Example 38 | 50.0 | 0.4 | 60 | 3 | Both ends and central portion | PET | tricot | 8 |
| Comparative Example 1 | — | 0.9 | — | — | Whole area | PET | tricot | 8 |
| Comparative Example 2 | — | 0.9 | 50 | — | Both ends | PET | tricot | 8 |
| Comparative Example 3 | — | 0.9 | — | — | Whole area | PET | tricot | 2 |
| Comparative Example 4 | — | 0.9 | 50 | — | Both ends | PET | tricot | 2 |
| Comparative Example 5 | — | 0.9 | — | — | Whole area | PET | tricot | 3 |
| Comparative Example 6 | — | 0.9 | 50 | — | Both ends | PET | tricot | 3 |

TABLE 3A

| | Removal Rate of TDS (%) | Amount of Water Produced (m³/day) |
|---|---|---|
| Example 1 | 99.35 | 45.4 |
| Example 2 | 99.25 | 44.1 |
| Example 3 | 99.32 | 45.7 |
| Example 4 | 99.28 | 44.3 |
| Example 5 | 99.30 | 42.5 |
| Example 6 | 99.45 | 45.5 |
| Example 7 | 99.33 | 44.1 |
| Example 8 | 99.37 | 45.9 |
| Example 9 | 99.35 | 44.4 |
| Example 10 | 99.41 | 44.3 |
| Example 11 | 98.30 | 43.5 |
| Example 12 | 99.30 | 42.2 |
| Example 13 | 99.05 | 35.2 |
| Example 14 | 99.51 | 45.7 |
| Example 15 | 99.35 | 52.5 |
| Example 16 | 99.48 | 52.6 |
| Example 17 | 99.30 | 0.61 |
| Example 18 | 99.45 | 0.61 |
| Example 19 | 99.35 | 0.71 |
| Example 20 | 99.44 | 0.73 |
| Example 21 | 99.30 | 1.84 |
| Example 22 | 99.39 | 43.8 |

TABLE 3B

| | Removal Rate of TDS (%) | Amount of Water Produced (m³/day) |
|---|---|---|
| Example 23 | 99.35 | 44.2 |
| Example 24 | 99.37 | 44.0 |
| Example 25 | 99.31 | 43.2 |
| Example 26 | 99.47 | 43.4 |
| Example 27 | 99.48 | 43.5 |
| Example 28 | 99.40 | 41.9 |
| Example 29 | 99.46 | 43.8 |
| Example 30 | 99.57 | 44.7 |
| Example 31 | 99.41 | 50.8 |
| Example 32 | 99.33 | 0.59 |
| Example 33 | 99.45 | 0.59 |
| Example 34 | 99.35 | 0.71 |
| Example 35 | 99.44 | 0.71 |
| Example 36 | 99.30 | 1.78 |
| Example 37 | 99.33 | 40.0 |
| Example 38 | 98.79 | 33.5 |
| Comparative Example 1 | 99.30 | 41.2 |
| Comparative Example 2 | 98.90 | 41.4 |
| Comparative Example 3 | 99.30 | 0.55 |
| Comparative Example 4 | 98.88 | 0.56 |
| Comparative Example 5 | 99.31 | 1.66 |
| Comparative Example 6 | 98.89 | 1.70 |

INDUSTRIAL APPLICABILITY

The separation membrane and the separation membrane element an be particularly suitably used in desalination of brackish water and sea water.

The invention claimed is:

1. A spiral separation membrane element comprising:
a water collection tube;
a separation membrane wound around the water collection tube, having a feed-side surface and a permeate-side surface, including a band-shaped region on at least one end of the feed-side surface in an axial direction of the water collection tube, and arranged such that the feed-side surfaces are opposed to each other; and
a channel material fused to the band-shaped region and comprising a plurality of resin bodies arranged by fusion at intervals in the band-shaped region such that the plurality of resin bodies are arranged as stripes, and the channel material is arranged such that the resin bodies provided on the feed-side surfaces opposed to each other are overlaid on each other; and
wherein the channel material is arranged only in at least one of areas within 20% of the width of the separation membrane from edges of the separation membrane in the longitudinal direction of the water collection tube;
wherein the resin body has a shape which is longer in one direction, and arranged such that longitudinal directions of the resin bodies are overlaid on each other to cross one another.

2. The spiral separation membrane element according to claim 1, wherein the resin body has a shape which is longer in an oblique direction relative to the axial direction of the water collection tube.

3. The spiral separation membrane element according to claim 2, wherein an angle between the longitudinal direction of the water collection tube and a longitudinal direction of the resin body is 60° or less.

4. The spiral separation membrane element according to claim 1, wherein the height of the resin body is 80 μm or more and 2000 μm or less.

5. The spiral separation membrane element according to claim 1, wherein at least one of the feed-side surface and the permeate-side surface includes a region having the height difference of 100 μm or more and 2000 μm or less.

6. The spiral separation membrane element according to claim 1, wherein the separation membrane comprises a substrate, a porous support layer formed on the substrate, and a separation functional layer formed on the porous support layer.

7. The spiral separation membrane element according to claim 6, wherein the substrate is a long fiber nonwoven fabric.

8. The spiral separation membrane element according to claim 7, wherein fibers at a surface layer opposite to the porous support layer-side surface layer of the long fiber nonwoven fabric are more vertically oriented than those at a porous support layer-side surface layer.

9. The spiral separation membrane element according to claim 1, comprising a resin body region in which resin bodies are arranged so that the distance between apexes thereof is 50 mm or less in the feed-side surface, and a region not corresponding to the resin body region, wherein an area ratio of the resin body region to the region not corresponding to the resin body region is 1:99 to 80:20.

10. The spiral separation membrane element according to claim 9, wherein three or more of the resin body regions are disposed for one separation membrane.

11. A method of producing a spiral separation membrane element including a water collection tube and a separation membrane wound around the water collection tube, comprising steps (a) to (c):
(a) preparing a separation membrane main body having a feed-side surface and a permeate-side surface and arranged such that the feed-side surfaces are opposed to each other;
(b) thermally fusing a channel material into a band-shaped region disposed on at least one end of the feed-side surface in an axial direction of the water collection tube, wherein 1) the channel material comprises a plurality of resin bodies arranged by fusion at intervals in the band-shaped region such that the plurality of resin bodies are arranged as stripes and the channel material is arranged such that the resin bodies provided on the feed-side surfaces opposed to each other are overlaid on each other, 2) the resin body has a shape which is longer in one direction, and arranged such that longitudinal directions of the resin bodies are overlaid on each other to cross one another, and 3) the channel material is arranged only in at least one of areas within 20% of the width of the separation membrane from edges of the separation membrane in the longitudinal direction of the water collection tube; and
(c) winding the separation membrane main body having undergone the step (b) around the water collection tube.

* * * * *